United States Patent
Jia et al.

(10) Patent No.: US 12,335,932 B2
(45) Date of Patent: Jun. 17, 2025

(54) SPEED AND SERVICE AWARE FREQUENCY BAND SELECTION

(71) Applicant: AT&T Intellectual Property I, L.P., Atlanta, GA (US)

(72) Inventors: Yupeng Jia, Austin, TX (US); Hongyan Lei, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 402 days.

(21) Appl. No.: 17/816,543

(22) Filed: Aug. 1, 2022

(65) Prior Publication Data

US 2024/0040553 A1   Feb. 1, 2024

(51) Int. Cl.
  *H04W 72/0453* (2023.01)
  *H04W 72/51* (2023.01)

(52) U.S. Cl.
  CPC ....... *H04W 72/0453* (2013.01); *H04W 72/51* (2023.01)

(58) Field of Classification Search
  CPC ... H04W 72/00; H04W 72/04; H04W 72/048; H04W 72/044; H04W 72/0453; H04W 4/027; H04L 27/26885; H04L 5/1446
  See application file for complete search history.

(56) References Cited

U.S. PATENT DOCUMENTS

| 9,131,466 B1* | 9/2015 | Oroskar | H04W 72/0453 |
| 11,363,599 B1* | 6/2022 | Park | H04W 84/18 |
| 2003/0064729 A1* | 4/2003 | Yamashita | H04W 72/02 |
|  |  |  | 455/104 |
| 2006/0068801 A1* | 3/2006 | Usuda | H04W 48/18 |
|  |  |  | 455/452.2 |
| 2010/0151877 A1* | 6/2010 | Lee | H04W 72/51 |
|  |  |  | 455/453 |

(Continued)

FOREIGN PATENT DOCUMENTS

| CN | 109511128 | * 9/2017 | H04W 24/04 |
| WO | WO-2008146361 A1 | * 12/2008 | H04W 72/048 |

(Continued)

*Primary Examiner* — Warner Wong
(74) *Attorney, Agent, or Firm* — Guntin & Gust, PLC; Dana B. LeMoine

(57) ABSTRACT

Speed and service aware frequency band selection processes for mobility networks are described. In one embodiment, a system can comprising a processor and a memory that stores executable instructions that, when executed by the processor, facilitate performance of operations. The operations comprise selecting a frequency band for performance of data communication between a communication device (CD) and network equipment of a communication network based on a speed of the CD, and instructing the CD to employ the frequency band for the data communication based on the selecting. In various embodiments, the selecting is responsive to the speed exceeding a threshold speed indicating the CD moving a high speed and the selected frequency band comprises a low frequency band tailored for data communication at the high speed. The frequency band selection can also account for other contextual criteria associated with the CD, including services/applications used, location, and route/trajectory of the device.

20 Claims, 12 Drawing Sheets

(56) References Cited

U.S. PATENT DOCUMENTS

| | | | |
|---|---|---|---|
| 2013/0142174 A1* | 6/2013 | Larsson | H04B 7/0619 |
| | | | 370/335 |
| 2013/0344803 A1* | 12/2013 | Isu | H04W 4/027 |
| | | | 455/39 |
| 2016/0080906 A1* | 3/2016 | Wang | H04L 27/0014 |
| | | | 455/456.1 |
| 2019/0069282 A1* | 2/2019 | Luo | H04L 5/0094 |
| 2021/0243725 A1* | 8/2021 | Plechinger | H04W 72/02 |
| 2022/0030592 A1* | 1/2022 | Wachi | H04W 72/51 |
| 2024/0023077 A1* | 1/2024 | Yajnanarayana | H04W 72/56 |

FOREIGN PATENT DOCUMENTS

| | | | | |
|---|---|---|---|---|
| WO | WO-2017000245 A1 * | 1/2017 | | H04L 5/0005 |
| WO | WO-2019146722 A1 * | 8/2019 | | H04W 24/08 |

* cited by examiner

SPEED AND SERVICE AWARE FREQUENCY BAND SELECTION

TECHNICAL FIELD

This disclosure relates generally to wireless communications and more particularly to speed and service aware frequency band selection.

BACKGROUND

Information that travels wirelessly uses radio waves, invisible airwaves that are a type of electromagnetic radiation (a form of light). Radio waves are measured by wavelength or frequency, with wavelength being the distance between two identical points in a waveform signal, and frequency referring to the number of waves that pass a given point per second. Radio waves are just a small part of what is called the electromagnetic (EM) spectrum, which is divided into sections called frequency bands. The radio frequency spectrum of the EM spectrum comprises a fixed range of range radio frequency bands.

Wireless communications operators are able to use certain radio frequency bands they have licensed from governments through spectrum auctions. Different parts of the radio spectrum have different performance characteristics. Generally, low-frequency transmissions can retain signal strength over longer distances than higher frequency transmissions. However, less data can be transmitted over these lower frequencies.

The above-described description is merely intended to provide a contextual overview regarding wireless communications, and is not intended to be exhaustive.

DETAILED DESCRIPTION

Figure 1:
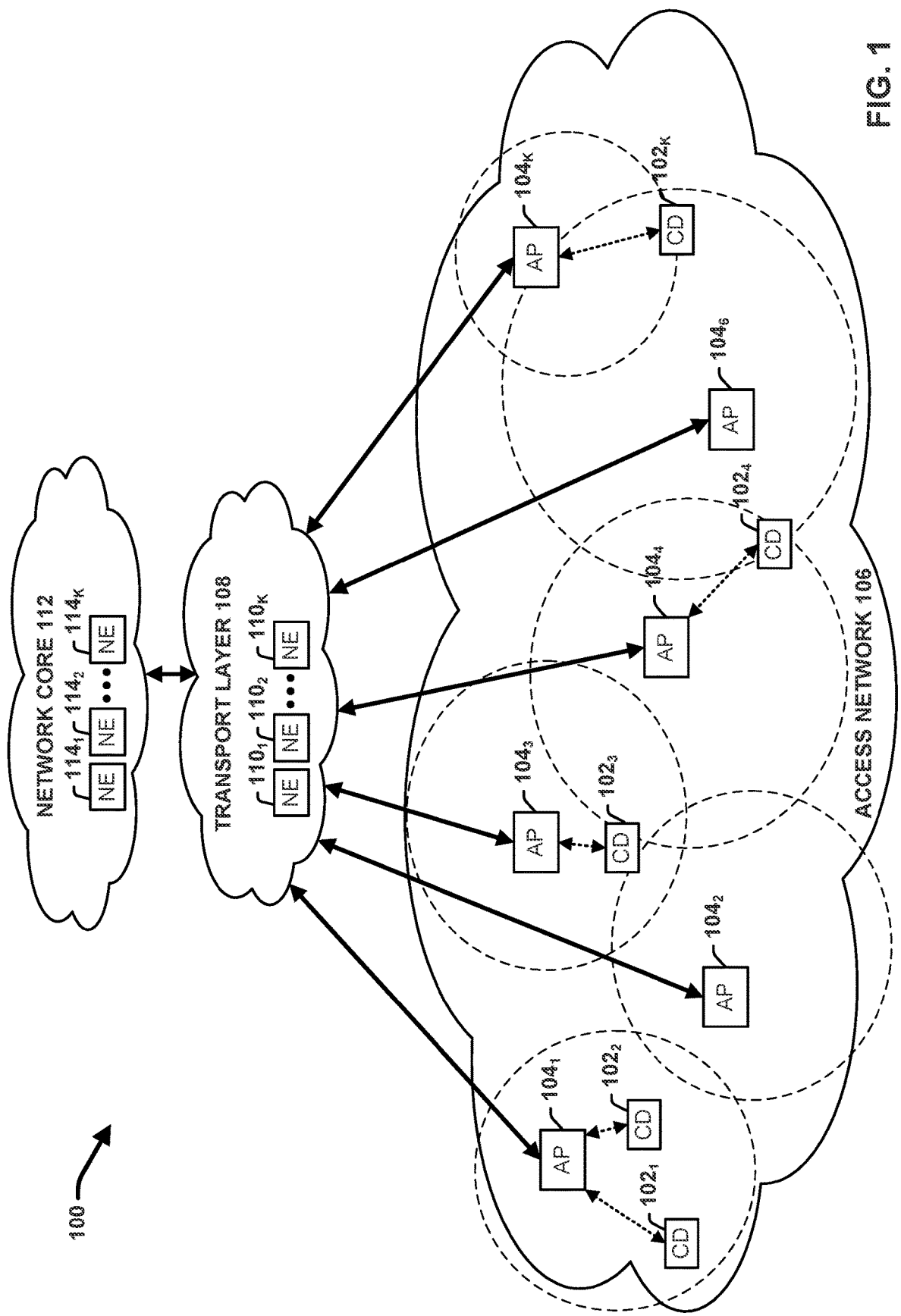
FIG. 1 illustrates an architecture diagram of an example communication system that supports speed and service aware frequency band selection, in accordance with various aspects and embodiments of the disclosed subject matter.

The following detailed description is merely illustrative and is not intended to limit embodiments and/or application or uses of embodiments. Discussed herein are various aspects and embodiments that relate to frequency band selection for wireless communications between communication devices and network equipment of a communication network based at least on communication device speed.

In the context of high speed UEs, such as those carried by or attached to high speed vehicles (e.g., high speed trains, high speed auotmobiles, high speed drones, etc.) with speeds exceeding 100 miles per hour (mph), doppler shift and doppler spread are severe and create challenges to radio resource management. In addition, UEs moving at high speeds, experience fast cell handover which drains battery life faster while creating significant signaling overhead between the UEs and the network.

As noted above, different parts of the radio frequency spectrum have different performance characteristics with different strengths and weaknesses. Generally, low-frequency transmissions can retain signal strength over longer distances than higher frequency transmissions. However, less data can be transmitted over these lower frequencies. As applied to a high speed UE, usage of a low range frequency band for data communication between the UE and respective network base stations along the UE's trajectory can provide for data communication over longer distances, resulting in less handover between cell cites along the UEs travel trajectory.

With this context in mind, the disclosed subject matter provides techniques to manage and optimize radio frequency band selection based on UE speed, particularly in scenarios in which the UE speed is considered moving at a high-speed (e.g., exceeding 100 mph or another speed threshold). In one or more embodiments, the disclosed subject matter provides a communication system that monitors UE speed and detects UEs moving or about to begin moving at a high speed (e.g., exceeding a threshold speed). Based on detection of a high-speed UE, the communication system can select a frequency band for data communication between the UE and the serving network node (e.g., the primary cell) tailored to optimize the data communication performance at the high speed. The communication system can further schedule/direct the high-speed UE and the serving network node to employ the selected frequency band for the data communication. In various embodiments, the frequency band selected for the high-speed UE can comprise a low frequency band characterized by a large wavelength and good penetration, hence enabling data communication between the UE and the serving network node over longer distances, thereby minimizing the frequency of cell cite handovers over the course of the UEs trajectory. In some embodiments, based on directing the UE and the serving network node to employ the selected frequency band, the communication system can further direct the high-speed UE and the serving network node to disable the scanning/detection of other frequency bands while moving at the high speed to save UE battery life and reduce signalizing overhead. The communication system can further transition the UE to a higher frequency band as applicable based on the UE speed dropping below the threshold speed.

In the context of a high-speed train or another type of high-speed vehicle that carries a group communication UEs at the same speed (e.g., UEs of all passengers of a high-speed train or the like), in some embodiments, the communication system can apply the same frequency band configuration to the group of UEs. The network can further allocate optimized network resources for the group. In some implementations of these embodiments, based on detection of one high speed UE in the group, the communication system can configure the detected UE to employ the selected frequency band configuration tailored for the high-speed data communication and further direct the detected UE to broadcast the selected frequency band configuration to the other UEs included in the group, thereby reducing the amount of signaling overhead between the network and the respective UEs in the group. In other words, the communication system can clone the "first detected" UE frequency band configuration to other devices located on the same transportation vehicle.

In addition to selecting the frequency band based on UE speed, the communication system can further tailor the selected frequency band based on service needs associated with the communication device or group of communication devices. In this regard, the communication system can select a higher frequency band that facilities optimized data communication for services that demand low latency and/or high reliability to optimize the user experience. For example, the network can schedule a high-speed UE to temporarily employ a high frequency band for an amount of time needed to perform a resource demanding data communication service (e.g., a data consuming download, a high-security financial transaction, a high-reliability implanted medical device (IMD) data communication, etc.), and thereafter transition the UE to a lower frequency band to minimize cell cite handover, battery drain and signaling overhead.

The disclosed communication systems can further employ principles of artificial intelligence and machine learning to facilitate optimized frequency band scheduling based on UE speed, location, and service criteria. In some implementations of these embodiments, the communication system can collect historical performance data for UEs moving at different speeds, over different trajectories, and under different types of service usage contexts and at different frequency band configurations (e.g., different frequency bands assignments). The system can further learn optimal frequency band configurations tailored for different UE speeds, trajectories and/or different service usage contexts. In some embodiments, the communication system can further generate different device context profiles corresponding to the different UE speeds, trajectories and/or different service usage contexts, wherein the different device context profiles are respectively associated with the corresponding learned optimal frequency band configurations. With these embodiments, based on detection/identification of a UE or group of UEs having a particular context profile, the communication system can apply the corresponding optimal frequency band configuration.

Additionally, or alternatively, the communication system can perform location-based frequency band scheduling and optimization, for example, by applying a certain scheduling profile in some pre-defined locations (i.e., predefined cell cites), with specific frequency band selection priority. In some implementations of these embodiments, the communication system can perform a prediction-based energy saving mechanism to configure the UE frequency band selection when returning to the same trajectory. For example, as applied to the high-speed train usage context, the system can learn the train schedule, the train stain pick-up/drop-off locations, and the trains speed pattern (e.g., respective speeds and speed changes, timing of speed-up, timing of slow-down, etc.) over the route/trajectory of the train. The system can further learn one or more optimal frequency band configurations (e.g., tailored to different UE types and/or service needs) to apply for data communication by UEs located on the train coinciding with the trains speed pattern. The system can predict, based on the UE location and movement pattern, when a UE will be riding on the train relative to the trains speed pattern and trajectory and pre-configure (e.g., before the train departs) the UE and the respective network nodes (e.g., base stations) along the trains trajectory to employ the predetermined optimal frequency band configuration during transport. The communication system can similarly predict speed ramp-up and slow-down for a UE (or groups of UEs) based on learned vehicle and/or UE movement/speed patterns, traffic and weather conditions, and apply the optimal frequency band profile accordingly to enable smooth frequency band transitions.

In some embodiments, the communication system can further control/adjust the speed of some high-speed vehicles (e.g., autonomous vehicles, drones, etc.) by directing the vehicle to slow down or speed up in conjunction with optimized frequency band scheduling. For example, the communication system can direct a vehicle carrying a UE to speed up over a portion of a travel route/trajectory where network base stations are sparse (e.g., spread out over longer distances) while also configuring the UE to employ a low frequency band, thereby ensuring reliable data communication at the high speed in rural areas. Likewise, the communication system can direct a vehicle carrying a UE to slow down for a period of time over which the UE is scheduled to employ a high frequency band for a particular resource demanding data communication service (e.g., requiring low latency, high reliability, high throughput, etc.), thereby ensuring reliable data communication without no or minimal handover over while performing the demanding data communication service.

The techniques for the management of frequency band selection of the disclosed subject matter can provide for enhanced (e.g., improved, more efficient, or optimal) utilization of resources associated with a telecommunication provider's radio frequency band spectrum allocation (e.g., improved spectral performance). The disclosed techniques further reduce handover frequency, signaling overhead and associated battery consumption associated with high speed UEs. The disclosed techniques further facilitate an enhanced user experience for users of communication devices via service-aware frequency band selection, and enhanced cost efficiency (e.g., reduction of costs) to users and service providers, among other benefits, as compared to existing techniques for selection of optimal frequency bands for utilization by communication devices, such as more fully described herein. Although various embodiments are described in the context of high-speed trains, it should be appreciated that the disclosed techniques can be applied to communication devices carried by, attached to, and/or embedded within any type of vehicle, such as but not limited to, aircraft (e.g., airplanes, drones, helicopters, jets, blimps, etc.), automobiles (e.g., manual and autonomous driving vehicles), and watercraft (e.g., boats, submarines, etc.).

In some embodiments, the non-limiting term network equipment (NE) is used. It can refer to any hardware component, software component, network nodeem device, machine, or group of nodes, components, devices, machines, etc., associated with a communication network, external to a UE. As used herein, the terms "network node," "network node component," and "network component" can be interchangeable with (or include) a network, a network controller, or any number of other network components. Further, as utilized herein, the non-limiting term radio network node, or network node can be used herein to refer to any type of network node serving communications devices and/or connected to other network nodes, network elements, or another network node from which the communications devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes also can comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Network nodes can be, for example, Node B devices, base station (BS) devices, access point (AP) devices, TRPs, and radio access network (RAN) devices. Other examples of network nodes can include multi-standard radio (MSR) nodes, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like.

The term access point (AP), AP device, access node or the like are used herein interchangeably to refer to any type of network node that can serve a UE and connect the UE to the network core of a wireless communication network as disclosed herein. The disclosed wireless communication systems can employ a variety of different types of APs that employ different type of wireless communication access technologies, including cellular, Wi Fi, satellite, and future access technologies. In this regard, the different types of wireless communication access technologies can include, but are not limited to: new radio, LTE, 2G, 3G, 4G, 5G, UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies and satellite communication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

In some embodiments, the non-limiting term user equipment (UE) is used. It can refer to any type of communication device that communicates with and connects to (or attempts to connect to) an AP of communication system. A UE also can be referred to for example as, communication device, a device, a mobile device, or a mobile communication device. The term communication device can be interchangeable with (or include) a UE or other terminology. Examples of communication devices can include, but are not limited to, a computer (e.g., a desktop computer, a laptop computer, laptop embedded equipment (LEE), laptop mounted equipment (LME), or other type of computer), a mobile terminal, a cellular and/or smart phone, a tablet or pad (e.g., an electronic tablet or pad), an electronic notebook, an electronic gaming device, electronic eyeglasses, headwear, or bodywear (e.g., electronic or smart eyeglasses, headwear (e.g., an augmented reality (AR), a virtual reality (VR), and/or extended reality (XR) headset), or bodywear (e.g., electronic or smart watch) having wireless communication functionality), a medical device, an implanted medical device (IMD), a set-top box, an IP television (IPTV), a device to device (D2D) UE, a machine type UE or a UE capable of machine to machine (M2M) communication, a Personal Digital Assistant (PDA), a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, or other type of device or sensor), a broadband communication device (e.g., a wireless, mobile, and/or residential broadband communication device, transceiver, gateway, and/or router), a dongle (e.g., a Universal Serial Bus (USB) dongle), a music or media player, speakers (e.g., powered speakers having wireless communication functionality), an appliance (e.g., a toaster, a coffee maker, a refrigerator, or an oven, or other type of appliance having wireless communication functionality), a device associated or integrated with a vehicle (e.g., automobile, airplane, drone, bus, train, or ship, or other type of vehicle), a virtual assistant (VA) device, a drone, a home or building automation device (e.g., security device, climate control device, lighting control device, or other type of home or building automation device), an industrial or manufacturing related device, a farming or livestock ranch related device, and/or any other type of communication devices (e.g., other types of IoTs). Various embodiments of the disclosed subject matter are directed to managing and optimizing data communication sessions of mobile devices as the move about a communication network. To this end, the term mobile UE, mobile device, or the like is used herein to explicitly refer to a UE that has mobility capabilities as opposed to a device designed to remain stationary.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 2G, 3G, 4G, or LTE systems. For example, aspects or features of the disclosed embodiments can be exploited in substantially any wireless communication technology. Such wireless communication technologies can include UMTS, Code Division Multiple Access (CDMA), wireless fidelity (Wi-Fi), Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

It is noted that the various aspects of the disclosed subject matter described herein can be applicable to single carrier as well as to multicarrier (MC) or carrier aggregation (CA) operation of the communication device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio bearers) on some carriers (e.g., data traffic and voice traffic can be simultaneously scheduled).

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Referring now to the drawings, FIG. 1 illustrates an architecture diagram of an example communication system (hereinafter system 100) that supports speed and service aware frequency band selection, in accordance with various aspects and embodiments of the disclosed subject matter. Communication system 100 can be or include one or more communication networks. The one or more communication networks can be associated with a single network provider, multiple network providers, and/or encompass a variety of different type of wired and wireless communication technologies (e.g., 3GGP, WiFi, LTE, satellite, 5G, etc.) and sub-networks.

Various embodiments of the disclosed subject matter are directed to tailoring frequency band selection for wireless data communications (i.e., using radio signals). In accordance with these embodiments, the communication system 100 can be or include one or more wireless communication networks that can operate to enable wireless data communication between communication devices (CD 1021-K). For example, a wireless communication device (e.g., mobile, cell, or smart phone; electronic tablet or pad; computer; Internet of Things (IoT) device; or other communication device) can connect to and communicate with a wireless communication network to communicate with another communication device connected to the wireless communication network or to another communication network (e.g., Internet Protocol (IP)-based network, such as the Internet) associated with (e.g., communicatively connected to) the wireless communication network.

System 100 comprises a distributed network architecture including network components distributed between an access network 106, a transport layer 108, and a network core 112. The network components of the respective layers (e.g., the access network 106, the transport layer 108 and the network core 112) and/or the network equipment (i.e., physical and logical resources) associated with the respective layers are communicatively and/or operatively coupled to one another via one or more wired or wireless communication channels.

The network core 112 can comprise a mobility core network (e.g., a wireless communication network) and/or a packet data network (e.g., an Internet Protocol (IP)-based network, such as the Internet and/or intranet) that can be associated with the mobility core network. The network core 112, also referred to as the network backbone, is responsible for transporting large amounts of traffic quickly and provides interconnectivity between the transport layer devices. The network core 112 comprises network equipment (NE 1141-K) including various core hardware and/or software elements which can vary. For example, next generation cellular networks are implementing substantially software defined network core elements. The NE 1141-K typically provides key Evolved Packet Core functions including the Mobile Management Entity (MME), the Serving Gateway (S-GW), the Packet Data Network Gateway (PDN-GW), the Home Subscriber Server (HSS), a Policy Control Rules Function (PCRF), an Access and Mobility Management Function (AMF), a User Plane Function (UPF), and others. The NE 1141-K may also include high speed devices, like high end routers and switches with redundant links.

The transport layer 106 serves as the communication trasport layer between the access network 106 and the network core 112. In accordance with the embodiment shown, the respecitve APs 1041-K can be communicatively coupled to the transport layer 108 via corresponding wired and/or wireless communication links. The transport layer 108 can comprise network equipment (NE 1101-K) including hardware and/or software components whose primary functions are to provide routing, filtering, and QoS management and to determine how data packets can access the network core 112. The physical/hardware NE associated with the transport layer 108 usually consists of routers, routing systems, and multilayer switches.

The access network 106 controls connection and access of communication devices (CDs 102₁-K) to the network core 112 (e.g., via the transport layer 108) via one or more physical network access points (APs 104₁-K). In accordance with the disclosed subject matter, the CDs 102₁-K correspond to mobile communication devices and the APs 104₁-K correspond to wireless communication APs via which the CDs 102₁-K can wirelessly connect with using their corresponding wireless access technology (e.g., 3G, LTE, 4G, 5G, Wi-Fi, etc.) to perform data communications provisioned via the network core 106. For example, the data communication services can relate to, for example, video streaming, video calls, video content, audio streaming, audio calls, audio content, electronic gaming, text messaging, multimedia messaging, emails, website content, medical information (e.g., medical information from wireless medical devices associated with users), utility information (e.g., utility information from smart meters), emergency-related information, military-related information, law enforcement-related information, fire response services-related information, disaster response services-related information, and/or other desired types of information, content, or activities.

It should be appreciated that a small number of APs and CDs are illustrated for brevity and that in practice, the number of APs and CDs in the access network 106 can vary and include hundreds, thousands, millions, etc., devices depending on the geographical area defined by the access network 106 (e.g., a state, a region, a country, the world, etc.). The subscript K is used hereinto denote any unlimited number of corresponding devices. It should also be appreciated that a plurality of UEs can connect to the same AP at a time.

In this regard, the types of the physical APs can vary and can include a variety of different types of access points devices/systems that employ a variety of different types of wireless communication access technologies (e.g., 3G, 4G, LTE, 5G, Wifi, satellite, etc.). Depending on the type of the APs, the APs may be standalone AP devices or part of separate communication networks (e.g., satellite communication networks, mobile communication networks, cellular communication networks, multi-carrier communication networks, etc.). For example, in some implementations, one or more of the APs 104₁-K can be associated with a service provider (e.g., a cellular service carrier) with which one or more of the CDs 102₁-K, has a subscription. One or more of the APs 104₁-K can also be associated with one or more roaming service providers (e.g., roaming partners) that can provide roaming service to the CDs 102₁-K, if and while the CDs 102₁-K are roaming in the communication system 100. One or more of APs 104₁-K can also include one or more smaller base stations that can be associated with private entities (and/or service providers, private networks, etc.). In some embodiments, the APs 104₁-K can be communicatively connected to each other, and can exchange information, such as network-related information and UE-related information, with each other, such as described herein.

In various embodiments, at least some of the APs 104₁-K included in the access layer 104 can correspond to base stations of a cellular communication network that employs a RAN architecture. The cellular communication network can correspond to a 5G network, an LTE network, a 3G network or another type of cellular technology communication network. With these embodiments, the access network 106 can include one or more RANs (not explicitly shown in FIG. 1), wherein each RAN can comprise or be associated with one or more base stations (e.g., APs 104₁-K), that can serve communication devices located in respective coverage areas or cells (e.g., indicated by the dashed circles) served by respective base stations in the access network 106. In this regard, each of the respective base stations (e.g., APs 104₁-K) can be associated with one or more sectors (not shown), wherein respective sectors can comprise respective cells (e.g., indicated by the dashed arrow lines). The cells can have respective coverage areas that can form the coverage area covered by the one or more sectors.

In some embodiments, the one or more RANs can be based on open-RAN (O-RAN) technology and standards. These standards can define the open interface that can support interoperability of network elements (e.g., radio unit (RU), central unit (CU), distributed unit (DU), real or near real time RAN intelligent controller (RIC), or other type of network element) from different entities (e.g., vendors). The network elements may be virtualized, e.g., software-based components that can run on a common virtualization/cloud platform. In certain embodiments, the O-RAN based RAN can utilize a common platform that can reduce reliance on proprietary platforms of service providers. The O-RAN based RAN also can employ standardized interfaces and application programming interfaces (APIs) to facilitate open-source implementation of the O-RAN based RAN.

In some embodiments, the one or more RANs can be a cloud-based radio access network (C-RAN). A C-RAN is a deployment paradigm that seeks to isolate baseband unit (BBU) from its remote radio unit (RRU) in base station (BS), consolidating the BBUs into a common place referred to as the BBU pool. In the BBU pool, the computing resources provided by the BBUs can be dynamically assigned to RRUs on demand by the BBU controller. Thus, with the fluctuation of data traffic from RRUs, a part of BBUs can be dynamically turned on or off.

The size (e.g., diameter) of the respective cells (e.g., indicated by the dashed circles) can vary depending on the type of the respective base stations (e.g., APs 104₁-K), the corresponding access technology and the entity with which they are associated (e.g., owned/operated/licensed). For example, one or more of the cells can comprise macro cells associated with a carrier (e.g., a carrier with which the user can have a subscription for communication services), macro cells associated with a roaming communication service provider, and/or smaller cells, such as femto cells, micro cells, pico cells, (e.g., a small cell associated with the unlicensed citizens broadband radio service (CBRS) spectrum, a small cell associated with a carrier licensed spectrum) or a Wi-Fi cell). As an example, an entity (e.g., an employer or a commercial business) can have a smaller cell to provide wireless communication service to UEs located at or in proximity to the place of business of the entity, wherein the entity can have a subscription where the entity pays, to a service provider, a flat fee (e.g., flat fee for unlimited service or a certain amount or level of service) or a per usage fee for the communication services provided to UEs via the smaller cell. A smaller cell, such as a CBRS cell, can communicate via the unlicensed spectrum (e.g., unlicensed CBRS spectrum), or a smaller cell can communicate via the licensed spectrum (e.g., carrier licensed spectrum).

Existing RAN techniques, systems, and methods for selecting cells to which a CD is to connect to are primarily based on the signal strength of radio signals between the cells and the CD, where the CD typically can select and connect to the cell that has the strongest signal strength. In this regard, as a mobile CD moves about a geographical area comprising a plurliaty of geographically distributed RAN APs, the CD typically connects to the nearest AP providing the strongest signal strength. A handover occurs when a CD connected to a first AP moves away from the first AP toward a second AP providing a stronger signal strength and in turn connects to the second AP and disconnects from the first AP.

Existing RAN techniques for selecting APs or their corresponding cells for mobile CDs to connect with fail to account for the speed of the CD. Moreover, aside from signal strength, existing RAN techniques fail to account for the different strengths and weakness of different frequency bands for utilization of data communication between the CDs and the serving cells/APs in a manner that accounts for their speed to minimize handovers and the amount of signalling overhead and associated CD battery consumption associated with scanning for different radio frequency signals (corresponding to different frequency bands) emitted from neighboring cells/APs for sequential handovers. For example, consider a usage scenario involving a CD traveling on a high-speed train as described with reference to FIG. 2.

Figure 2:
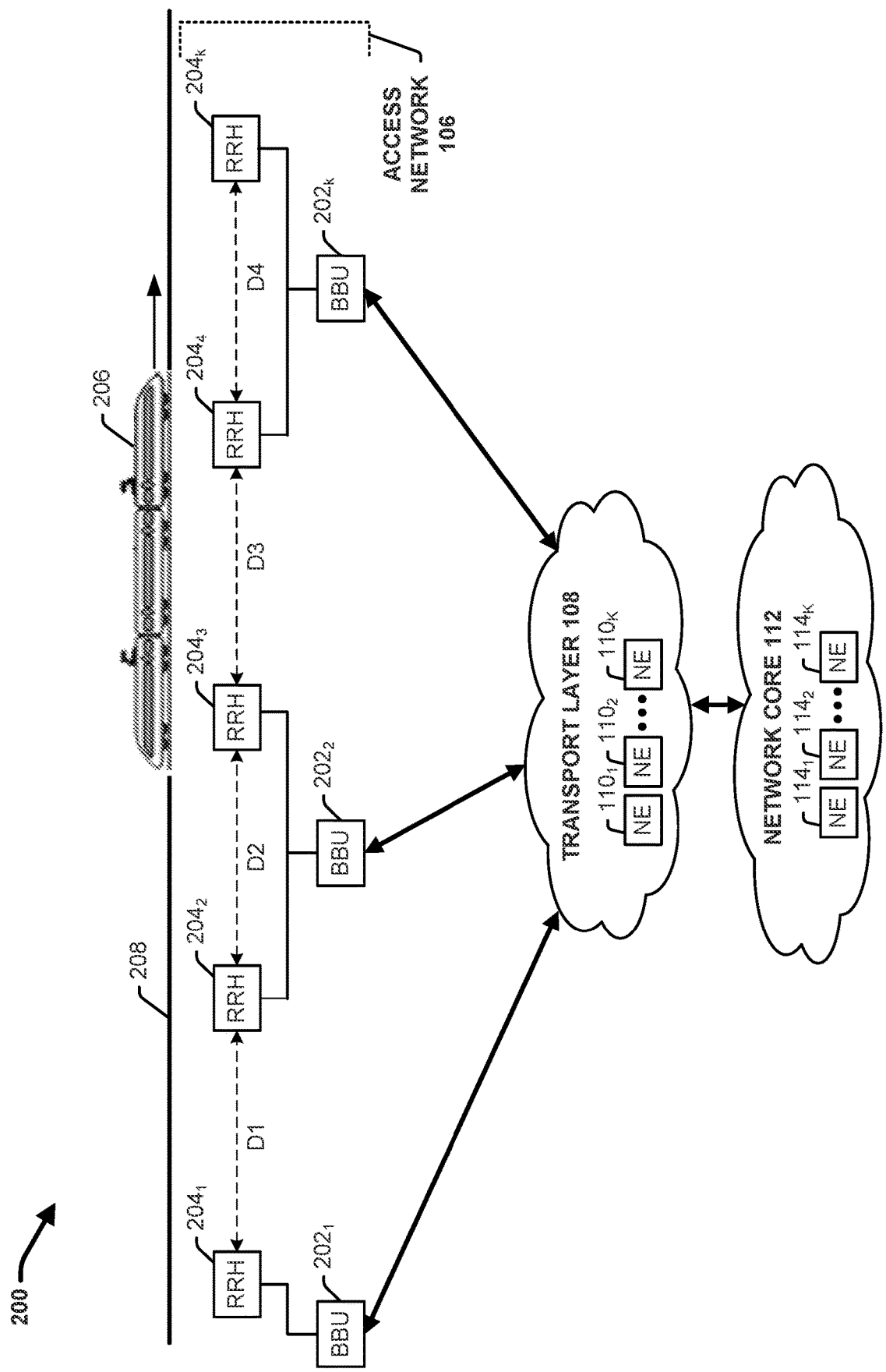
FIG. 2 illustrates an architecture diagram of an example communication system associated with a high-speed train system that supports speed and service aware frequency band selection, in accordance with various aspects and embodiments of the disclosed subject matter.

FIG. 2 illustrates an architecture diagram of an example communication system 200 associated with a high-speed train system that supports speed and service aware frequency band selection, in accordance with various aspects and embodiments of the disclosed subject matter. With reference to FIG. 2 (and FIG. 1), in one or more embodiments, communication system 100 can include communication system 200. For example, communication system 200 can correspond to a sub-network of communication system 100. Repetitive description of like elements employed in respective embodiments is omitted for sake of brevity.

Similar to system communication 100, communication system 200 network equipment distributed between an access network 106, a transport layer 108 and a network core 112. In accordance with this embodiment, the access network 106 comprises a plurality of remote radio heads (RRHs 2042-K) distributed at different locations along the train track 208 of a high-speed train 206. The respective RRHs can operate as wireless APs of the communication system 200 to enable wireless data communication between CDs (not shown) located on or within the high-speed train 206 (e.g., UEs of passengers and/or CDs mounted on or within the train) connected thereto using their corresponding wireless communication access technologies (e.g., 3G, 4G, LTE, 5G, and beyond). In this regard, in various embodiments, the RRHs (2041-K) can correspond to the APs 1041-K (or a subset thereof) of communication system 100, and the CDs located on or within the train 206 (not shown) can correspond to CDs 1041-K (or a subset thereof). Each of the respective RRHs 2041-K are connected to at least one baseband unit (BBU) of BBUs 2021-K, which connect the RRHs to the trasport layer 108. It should be appreciated that single BBU can be connected to and support operations of one or more more RRHs (e.g., two, three, four, etc.).

The RRHs 2041-K are spaced aparted from one another along the track 208 by resective distances D1, D2, D3 and D4. It should be appreciated that the distances betweeen neighboring RRHs can be the same or different. Each of the RRHs 2041-K can provide wireless coverage corresponding to a distinct cell cite. In accordance with existing RAN techniques, systems, and methods for selecting cells to which a CD is to connect to are primarily based on the signal strength of radio signals between the cells and the CD, as the train 206 moves along the track 208 passing from one RRH to the next, the CDs on or within the train 206 will typically connect to the nearest RHH. For example, as illustrated in FIG. 2, the train 206 is positioned between RRH 2043 and RRH 2044 and moving in the direction from right to left (es indicated by the arrow). In this context, the CDs of the train will typically be connect to RRH 2043 and switch to RRH 2044 as the train moves away from RRH 2043 towards RRH 2044. Because of the high-speed nature of the train 206 (e.g., 100 to 300 mph), this connection management scheme results in frequent and fast cell handover while further consuming significant UE battery life and signalling overhead attributed to scanning/detecting radio signals and their corresponding strengths associated with respective cell cites over the duration of the train movement.

However, the coverage area and/or signal strength of the respecitve RRHs 2041-K can vary depending on the particular radio frequency bands available to the communication network 200 (e.g., the licensed portion of the radio frequency spectrum allocated to one or more carriers/providers of the communication network 200) for usage by the RRHs 2041-K to perform wireless data communications with the CDs located on and/or within the train 206. In particular, as noted above different parts of the radio frequency spectrum have different performance characteristics with different strengths and weaknesses. Generally, low-frequency transmissions can retain signal strength over longer distances than higher frequency transmissions. However, less data can be transmitted over these lower frequencies. As applied to a high speed CDs such as those located on or within the high-speed train 206, in order to provide good wireless coverage at a high frequency band (e.g., using a high frequency band associated with about a 100 meter transmission distance), the communication system 200 will require dense positioning of the respective RHHs (e.g., small intersite distances D1, D2, D3, D4, etc., such as every 100 meters). On the other hand, usage of a low range frequency band for data communication between the CDs and respective network base stations (e.g., the RRHs) along the trains trajectory can provide for data communication over longer distances, resulting in less handover between cell cites. As a result the intercite distances between the RRHs can be increased (e.g., requiring fewer RRH installations along all or a designated portion of the track over which low frequency bands are used).

With this context in mind, the disclosed communication systems (e.g., system 200, system 100 and the like) can employ techniques to manage and optimize radio frequency band selection based on at least in part on CD speed, particularly in scenarios in which the CD speed is considered moving at a high-speed (e.g., exceeding 100 mph or another speed threshold). In one or more embodiments, the communication systems (e.g., system 200, system 100 and the like) can monitor the speed of CDs (e.g., CDs 1041-K, including CDs located on or within the train 206 or another vehicle) as the move about the geographical coverage area of the wireless communication network or networks of the system. The communications systems can further tailor the frequency band configurations for performing data communications between the CDs and their serving network nodes (e.g., APs 1041-K, RRHs 2041-K, and the like) based at least in part on their speed. For example, the communication systems can decrease the frequency level of the selected frequency band as the CD speed increases to minimize handover frequency and associated signaling overhead and increase the frequency level of the selected frequency band as the CD speed decreases to enable lower latency and higher reliability data communications when fewer handovers are observed. The communication systems (e.g., system 100, system 200 and the like) can further tailor frequency band selection based on different data communication services and applications being utilized by the CDs during the communication sessions and suitability of the respective frequency bands to satisfy performance demands (e.g., with respect to latency, reliability, throughput, etc.) associated with the different types of data communication services.

In this regard, the frequency band configurations can include a specific frequency band of groups of frequency bands selected for both uplink and/or downlink transmissions (e.g., which may be the same or different), a specific duplexing mode (e.g., a frequency division duplex (FDD) mode or a time division duplex (TDD) mode), a specific duration of time for usage of the specific frequency band or group of bands, or another configuration criterion that controls when, where and for how long the CD and the serving nodes are to apply the specific frequency band or group of bands (e.g., based on a service criterion, a location criterion, or another criterion).

In various embodiments, the particular frequency bands the communication systems (e.g., communication system 100, communication system 200, and the like) can employ for wireless data communications include a fixed set of frequency bands of the radio frequency spectrum authorized for usage by the communication systems (e.g., the carrier or multicarrier licensed portion of the radio frequency spectrum). In this regard, the radio frequency spectrum refers to the range of radio frequencies that can carry data from user CDs to cellular base stations (e.g., the RRHs 204$_{1-K}$) to the data's endpoint. According to the 3GPP standards body, the radio frequency spectrum used by LTE networks ranges from 700 megahertz (MHz) to 2.7 gigahertz (GHz). The 5G spectrum comprises a range of radio frequencies in the sub-6 GHz range and the millimeter-wave (mmWave) frequency range, that is 24.25 GHz and above. The frequency bands for 5G networks have been divided into two sets including a set of low range frequency bands, referred to as Frequency range 1 (FR1) and the sub-6 GHz range, and a set of high range frequency bands, referred to as Frequency range 2 (FR2) and the mmWave (millimeter wave) spectrum. The frequency bands of FR1 range from 450 MHz to 6 GHz and include the LTE frequency range.

Generally, lower frequency bands, such as those within the FR1 transmissions can retain signal strength over longer distances than higher frequency bands, such as those within the FR2 range, however, less data can be transmitted over these lower frequencies. For example, frequency bands within the FR1 set (e.g., n5 and the like, noting that in 5G, the NR bands are defined with prefix of "n") provide excellent coverage over longer distances relative to frequency bands within the FR2 set, however FR1 frequency bands are attributed to limited service capacity relative to FR2 bands and are not particularly suitable for bandwidth hungry, high-data rate/high latency applications. Frequency bands included in FR1 and FR2 can further be duplexed according to either a FDD mode or a TDD mode to share spectrum bands and provide frequency band configurations with different performance characteristics. For example, frequency band n260, also referred to as the mmWave 39 GHz, is a frequency TTD mode band designated by the 5G NR standard and is currently the highest-defined frequency 5G band in the FR2 range. FR2 TDD frequency bands (e.g., n260 and the like) have the shortest transmission time intervals (TTI) with wider bandwidths and a relatively relaxed TDD coexistence requirement. However, in comparison to FR1 bands, these FR2 TDD bands have higher power consumption, lack of coverage continuity and provide lower reliability due to blockage and smaller cell coverage. In another example, the frequency bands within the FR1 set with TDD can be considered mid-range bands that provide a balance between the strengths and weaknesses between FR1 FDD bands (e.g., n5) and FR2 TDD bands (e.g., n260). For example, FR1 TDD bands (e.g., n77) have a wide bandwidth availability and good with a stringent TDD coexistence requirement, however the latency performance is dominated by the TDD configuration.

Regardless of the specific frequency bands available for use by the communication system (e.g., licensed or otherwise open source), the available frequency bands can include a range of different frequency bands with different frequency ranges ranging from a lowest frequency to a highest frequency. In various embodiments, the available frequency bands can be grouped into three sets, including a set of low-range frequency bands comprising a distribution of different low range frequencies, a set of a mid-range frequency bands comprising a distribution of different mid-range frequencies higher than low-range frequencies, and a set of high-range frequency bands comprising a distribution of different high-range frequencies higher than the mid-range frequencies. In some implementations of these embodiments, the low-range frequency bands can include bands included in the FR1 set with FDD (i.e., FR1-FDD bands), the mid-range frequency bands can include bands included in the FR1 set with TDD (i.e., FR1-TDD bands), and the high-range frequency bands can include bands included in the FR2 set with TDD (i.e., FR2-TDD bands).

The disclosed techniques for managing and optimizing radio frequency band selection based on CD speed can be controlled by network equipment (NE) of the communication system (e.g., communication system 100, communication system 200, or the like), UE of the communication system (e.g., the CDs), or a combination thereof. Features and functionalities of the NE and the CDs in association with these different embodiments are further described with reference to FIGS. 3-5.

Figure 3:
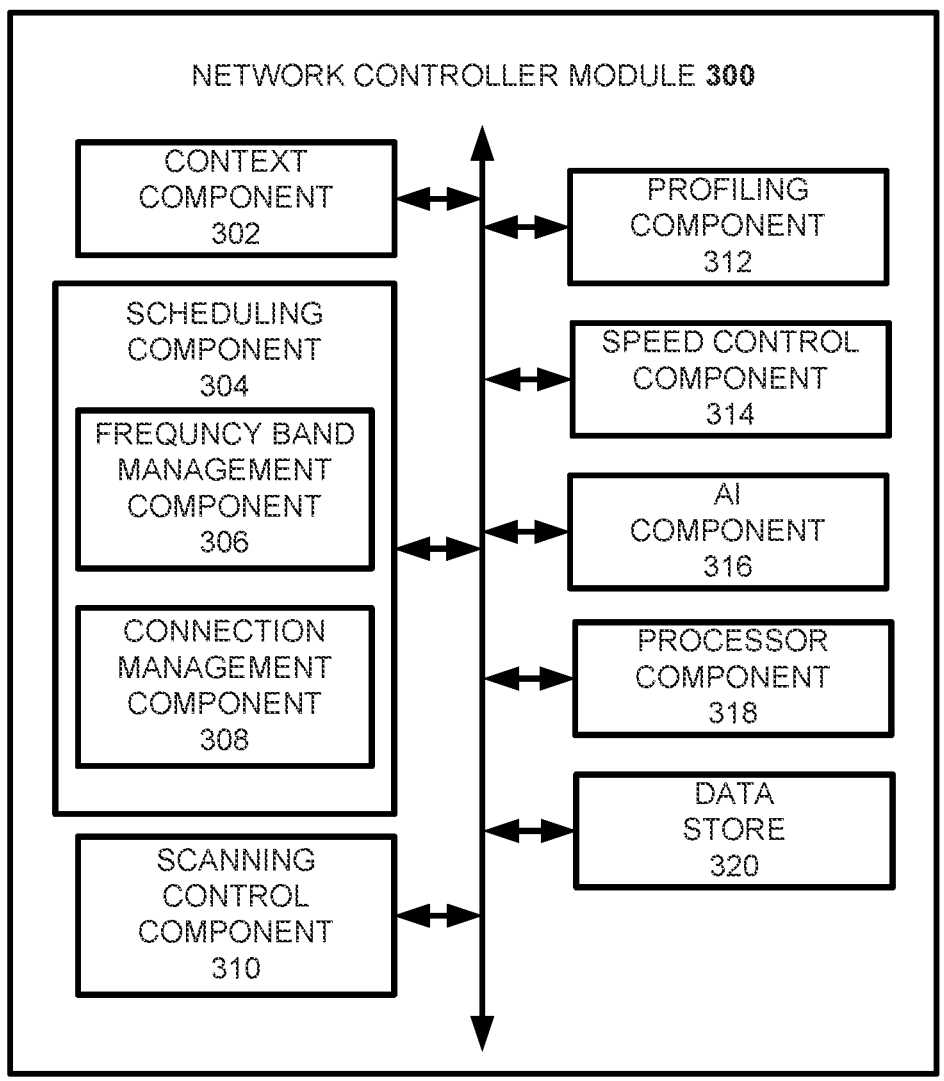
FIG. 3 depicts a block diagram of an example network controller module that facilitates speed and service aware frequency band selection, in accordance with various aspects and embodiments of the disclosed subject matter.

With reference to FIG. 3 depicts a block diagram of an example network controller module 300 that facilitates speed and service aware frequency band selection, in accordance with various aspects and embodiments of the disclosed subject matter. With reference to FIG. 3 (in association with reference to FIGS. 1 and 2), the network controller module 300 (and/or one or more components of the network controller module 300) corresponds to a network that can be associated with one or more network equipment of communication system 100 and/or communication system 200.

In some embodiments, the network controller module 300 (and/or one or more components thereof) can correspond to one or more NE 114$_{1-K}$ associated with the network core 112. For example, Cloud Radio Access Networks (RAN) can enable the implementation of concepts such as a software-defined network controller (SDN) and network function virtualization (NFV) in 5G networks. The SDN controller can control routing and scheduling of traffic within the wireless communication network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end. In this regard, in some embodiments, one or more functions of the network controller module 300 described below with reference to the enumerated components can be performed by and/or otherwise associated with a SDN controller associated with the network core 112. Additionally, or alternatively, one or more functions of the network controller module 300 described below with reference to the enumerated components can be performed by and/or otherwise associated NE of the access network 106, such as one or more of the APs ($104_{1-K}$), one or more of the RRHs $204_{1-K}$ and/or one or more of the BBUs $202_{1-K}$. For example, in some implementations, each of the APs ($104_{1-K}$) may include instances of the network controller module 300 and/or one or more components of the network controller module 300. Still in other embodiments, the network controller module 300 (and/or one or more components thereof) can correspond to one or more NE $110_{1-K}$ associated with the transport layer 108.

The network controller module 300 can comprise various computer executable/machine executable components, including context component 302, scheduling component 304, frequency band management component 306, connection management component 308, scanning control component 310, profiling component 312, speed control component 314, AI component 316, a processor component 318, and a data store 320.

The context component 302 can determine and monitor CD context information regarding current and predicted (e.g., upcoming) contexts and of respective CDs $102_{1-K}$ of the communication system (e.g., communication system 100, communication system 200, or the like). The context information can include (but is not limited to), information regarding CD speed, CD location, CD trajectory, (e.g., direction of movement, route, etc.), and applications and services being utilized, expected to be utilized, and/or requested for utilization, by the CDs in association with data communication sessions.

In some embodiments, the CD speed information can include the current speed of the respective CDs as monitored in real-time or substantially real time. The CD speed information can also include predicted speeds of one or more CD, such as predicted upcoming changes in speed (e.g., speed up and slow down) and predicted upcoming speed patterns (e.g., speed patterns as a function of time and/or location). Additionally, or alternatively, the context component 302 can be configured to monitor the CD speed in association with detecting CDs with specific speed that fall above or below a defined threshold speed. For example, the context component 302 can detect CDs with a speed classified as a "high-speed" based on their speed exceeding a threshold speed (e.g., 100 mph, 200 mph, 300 mph, etc.), and detect CDs with a speed classified as a "low-speed" based on their speed falling below the threshold speed. In some embodiments the threshold speed for classification of the CD as being a high-speed CD can be set to at around 100 mph. In other embodiments, the threshold speed for classification of the CD as being a high-speed CD can be set to at around 150 mph. In other embodiments, the threshold speed for classification of the CD as being a high-speed CD can be set to at around 200 mph. In other embodiments, the threshold speed for classification of the CD as being a high-speed CD can be set to at around 250 mph. In other embodiments, the threshold speed for classification of the CD as being as a high-speed CD can be set to at around 300 mph.

The number of different speed level classifications and corresponding thresholds can vary. For example, in some implementations, the system can define a plurality of different CD speed categories corresponding to different speed groups/ranges defined by different maximum and minimum speeds. For instance, a first speed classification may correspond to a CD speed below a first threshold (e.g., 1.0 mph or substantially stationary), a second speed classification may correspond to a CD speed between the first threshold and a second threshold, (e.g., 1.0 mph and 10 mph), a third speed classification may correspond to a CD speed between the second threshold and a third threshold (e.g., 10 mph and 30 mph), fourth speed classification may correspond to a CD speed between the third threshold and a fourth threshold (e.g., 30 mph and mph), and so on. In this regard, the different speed classifications can correspond to different speed levels ranging from a stationary speed to a highest speed classification (e.g., exceeding 300 mph), wherein the level of granularity of the different speed group classifications therebetween can vary (e.g., stationary, lowest speed, low speed, medium speed, high speed, highest speed, or a more granular break down).

The context component 302 can employ various techniques to determine or predict (e.g., using AI component 316) and monitor the speed of CDs, CD location and CD movement patterns/trajectories. In some embodiments, information regarding CD speed and/or location can be reported by the CDs to the network equipment (e.g., APs $104_{1-K}$, RRHs $204_{1-K}$ or the like). For example, in some implementations, the CDs can be configured to determine and report their location and speed information to the network equipment on a regular basis, according to a defined schedule and/or in response to a trigger event (e.g., a change in speed/location, the speed exceeding a threshold speed, a handover event, etc.). In other embodiments, the context component 302 can determine the CD speed based on information reported to the NE by the CDs included in the CD mobility reports and/or the radio resource management reports (RRMs). For example, the mobility reports and/or the RRMs can include information reported by the respective CD identifying or indicating the number of different network APs the CD detects as a function of time and the context component 302 can classify the CD speed into a specific speed group classification (e.g., low speed, medium speed, high speed, etc.) based on the frequency (e.g., relative to a defined time frame) of new AP detections being above and/or below one or more thresholds. For example, the context component 302 can detect and classify a high-speed CD based on the frequency of new AP detection reported by the CD exceeding a threshold frequency. In another example, the context component 302 can classify the CD speed into one or more defined speed group classifications based on the frequency of handovers that the CD experiences (e.g., wherein the higher the handover frequency the higher the speed). For example, the context component 302 can detect and classify a high-speed CD based on the frequency of handovers for the CD exceeding a threshold frequency.

In another example, the context component 302 can employ CD reported information regarding reference signals received power (RSRP) reported by the CDs. In this regard, in cellular networks, when a mobile device moves from cell to cell and performs cell selection/reselection and handover, it has to measure and report the signal strength and quality of the neighbor cells. Typically, the closer the CD is located to the cell center where the AP is located, the higher the signal strength. In this regard, the context component 302 can determine or estimate the speed of a CD based on the rate and degree of change in the reported signal strength between the UE and respective APs as a function of time. Still in other embodiments, the context component 302 can determine or estimate the CD speed based on doppler effects associated with the physical random-access channel (PRACH) falling above or below one or more defined thresholds. The PRACH is used by UEs to request an uplink allocation from the network base station. High doppler effects associated with the UE PRACH can indicate high speeds. In this regard, the context component 302 can detect and classify a high-speed CD based on the amount and/or the degree of doppler effects associated with the UE PRACH exceeding a threshold amount/degree.

The scheduling component 304 can perform CD scheduling based on the current and/or predicted (e.g., upcoming) contexts of CDs. In various embodiments, the CD scheduling can include frequency band scheduling (e.g., performed by the frequency band management component 306) and connection scheduling (e.g., performed by the connection management component 308).

The connection management component 308 can determine and maintain connection management information for respective CDs of the network identifying their current base stations to which they are connected. In some embodiments, the connection management component 308 can further select subsequent target cells (e.g., or their corresponding base stations) for CD handover procedures based on their current and/or predicted, upcoming contexts. In particular, the connection management component 308 can determine, a subsequent target cell for directing the CD to connect with based on the current speed of the CD, the predicted speed of the CD, and the predicted route or trajectory of the CD.

The frequency band management component 306 can determine or select an optimal frequency band for usage by a CD in association with performing data communications with one or more APs of the network (e.g., the current or primary cell and/or optionally neighboring cells) based on the current and/or predicted (e.g., upcoming) context of the CD. As noted above, the contextual factors used by the frequency management component 306 to determine or select the optimal frequency band can relate to CD speed, CD location, CD trajectory, (e.g., direction of movement, route, etc.), and applications and services being utilized, expected to be utilized, and/or requested for utilization, by the CDs in data communication sessions. The scheduling component 304 can further direct or configure the CD and its current AP to employ the selected frequency band configuration. For example, the scheduling component 304 can send the CD and its current AP (and optionally subsequent APs along the CDs trajectory) scheduling information identifying the selected frequency band configuration for usage by the CD in association with performing data communications with its current AP (and optionally subsequent APs), and the CD and the AP (or APs) can apply the frequency band configuration accordingly based on reception thereof.

In some embodiments, in association with scheduling a CD to employ a specific frequency band configuration, the scanning control component 310 can further direct the CD to forgo scanning/detecting other frequency bands (aside from the scheduled frequency band or bands) for a duration of time to minimize associated CD battery consumption and network signaling overhead. In this regard, in order to switch between different frequency bands, CDs (e.g., CDs $104_{1-K}$) can implement a frequency band scanning procedure that involves regularly or continuously scanning for available and detectable radio frequency bands and communicating with network equipment regarding the detected radio frequency bands. This scanning procedure drains CD battery and increasing network signaling overhead. To minimize battery consumption and network signaling overhead associated with this scanning procedure, in some embodiments, based on and/or in association with directing a CD to employ a specific frequency band configuration, the scanning control component 310 can also direct the CD to temporarily forgo (e.g., temporarily disable/deactivate) scanning/detecting some frequency bands (aside from the scheduled frequency band or bands) for a duration of time. For example, based on scheduling a CD to employ a low frequency band or group of low-frequency bands for data communication with its primary cell, the scanning control component 310 can also direct the CD to temporarily disable scanning mid-range frequency bands and/or high-range frequency bands.

In some embodiments, the frequency band management component 306 can employ predefined frequency band scheduling information (e.g., stored in data store 320) that relates different CD speed group classifications to different optimal frequency bands or groups of frequency bands determined to be optimal for performing data communications at the respective speed group classifications. In general, higher frequency bands can be correlated with lower speeds, and vice versa. With these embodiments, based on detection (e.g., via context component 302) of a CD having a current or upcoming speed group classification, the frequency band management component 306 can select the corresponding optimal frequency band for performing data communication at the corresponding speed. The scheduling component 304 can further direct or configure the CD and its current AP to employ the selected frequency band.

The level of granularity of the frequency band scheduling information can vary and will vary based on the number of different speed group classifications defined. For example, in some implementations, the frequency band scheduling information can define a first set of high frequency bands (e.g., FR2-TDD bands) determined applicable for CDs having a low-speed classification (e.g., relative to a first maximum threshold speed), a second set of medium frequency bands (e.g., FR1-TDD bands) determined applicable for CDs having a medium-speed classification (e.g., relative to the first maximum speed threshold and second maximum speed threshold), and third set of low frequency bands (e.g., FR1-FDD bands) determined applicable for CDs having a high-speed classification (e.g., relative to the second maximum speed threshold). In accordance with this example, the frequency band management component 306 can select a frequency band usage by a CD from the first, second or third set, depending on the corresponding speed group classification of the CD.

In one or more additional embodiments, in addition to CD speed, the predefined frequency band scheduling information can further account for different types of applications and services, associated performance requirements (e.g., latency requirements, reliability requirements, bandwidth requirements, data rate requirements, etc.) associated with the different types of applications and services, and applicable frequency bands determined suitable for satisfying the performance requirements. In this regard, as noted above, low-frequency bands (e.g., FR1-FDD bands) are not ideal for performing data communications associated with applications and services with high bandwidth/high data rate applications (e.g., large downloads/uploads, real-time video streaming, high security transactions, etc.). Thus, in some implementations in which a high-speed CD is utilizing, has requested to utilize, and/or is expected to utilize a high resource demanding service/application embodiment, the frequency band management component 306 can select a frequency band for utilization by the CD that prioritizes the service requirement associated with the service/application over the CD speed (e.g., a high frequency band) and/or determined to balance both the service requirement and the CD speed (e.g., a mid-range frequency band). With these embodiments, the frequency band scheduling information can define rules and/or protocols that tailor frequency band selection as a function of both CD speed and type of application or service (i.e., service aware and speed aware frequency band selection). In general, higher frequency bands are more suitable for high resource demanding applications/services, and vice versa. In some implementations of these embodiments, based on detection of a high-speed CD utilizing or requesting to utilize a resource demanding application/service, the scheduling component 304 can temporarily schedule the CD to employ a high-frequency band during utilization of the resource demanding application/service, and thereafter transition the high-speed CD to a lower frequency band.

In some embodiments, the frequency band management component 306 can determine or select an optimal frequency band for usage by a CD in response to reception of a request from the CD identifying or indicating a desired frequency band for utilization by the CD. With these embodiments, the one or more of the CDs (e.g., CD $104_{1-K}$) can be configured to determine an optimal frequency band or optimal frequency band classification (e.g., a low-frequency classification, a mid-frequency classification, and a high-frequency classification) for performing their current data communications based on the CD speed or a combination of the CD speed and an associated service requirement. For example, the CDs can employ same or similar predefined frequency band scheduling information described above to determine/select the appropriate frequency band or frequency band class based on their speed or speed/service requirement. Based on and/or in response to reception of the request, the frequency band management component 306 can configure the CD to employ the requested frequency band or a frequency band within the requested frequency class. For example, in some implementations, one or more of the CDs (e.g., CD $104_{1-K}$) can be configured to monitor and detect their speed group classification. Based on detection of a change in speed group classification (e.g., from a low speed-group classification to a high-speed group classification for instance), the one or more CDs can be configured to send a request to the NE (e.g., their current AP) requesting usage of a frequency band or frequency band class previously determined applicable to the new speed group classification (e.g., a low-frequency band based on detection of a high-speed group classification) With these embodiments, the operations including CD speed detection and optimal frequency band selection based thereon can be performed (at least in part) by the CD as opposed to the network.

In various embodiments, the disclosed techniques can be applied in association with managing frequency band configurations employed by CDs associated with high-speed vehicles, such as high-speed trains, automobiles, airplanes, and other types of high-speed vehicles. In accordance with this usage scenario, the high-speed vehicle may carry a plurality of passengers and/or associated CDs. For example, as applied to the high-speed train embodiment, several passengers located in different sections (e.g., cabins or the like) of the train may have one or more personal CDs (e.g., mobile phones, smart watches, laptops, etc.). In addition, one or more CDs may be integrated on (e.g., embedded on the roof) or within the train that perform telecommunication services associated with the train operations. In some implementations of these embodiments, rather than performing separate speed detection and frequency band configuration operations for each of the CDs located on or within the same high-speed vehicle, the disclosed systems (e.g., system 100, system 200 and the like) can employ techniques to minimize repetition of these procedures for a group of CDs located on the high-speed vehicle.

In some implementations, based on configuring one CD located on or within a "shared" transportation vehicle to employ a specific frequency band configuration, the scheduling component 304 can direct the CD to broadcast the specific frequency band configuration to other CDs located on or within the same transportation vehicle (e.g., using one or more ad-hoc networks formed between the co-located CDs). The one or initial configured CD can correspond to a CD of a passenger or in other implementations, a CD embedded on or within the vehicle (e.g., physically mounted on or within the vehicle). For instance, in some implementations wherein a CD is physical integrated on or within a high-speed vehicle, the scheduling component 304 can recognize the CD as an embedded high-speed vehicle device associated with a group transportation vehicle (e.g., via a unique device identifier). The context component 302 thereafter only needs to detect the speed of the embedded CD and configure the optimal frequency band configuration for the embedded CD based on the detected speed of the embedded CD. Thereafter, the embedded CD can broadcast the optimal (speed tailored) frequency band configuration to other CDs located on or within the same transportation vehicle as their speed profile will be the same or substantially the same as the embedded CD (e.g., with minor differences as applied to trains depending on the train length and the relative positions of the CDs distributed about the length the train).

As noted above, to determine and select an optimal frequency band configuration for scheduling data communications between a CD and its serving cell, in some embodiments, the frequency band management component 306 can employ predetermined frequency band frequency information stored in the data store 320 (or another suitable memory accessible to the frequency band management component 306) that correlates different CD speeds or speed group classifications with different predetermined optimal frequency band configurations, and/or different combinations of CD speeds and service types with different predetermined optimal frequency band configurations. In other embodiments, frequency band management component 306 can employ predefined context profiles (e.g., generated by the profiling component 312 and/or the AI component 316) that correlate different CD contexts with optimal frequency band configurations. The context profiles can account for CD speed and service criteria as well as additional criteria, including CD location, CD route or trajectory, and CD speed patterns along the route/trajectory. With these embodiments, based on detection/identification of a UE or group of UEs having a particular context profile (e.g., being associated with a particular speed or speed pattern, a particular location, a particular route or trajectory and/or a particular type of service usage criteria), the communication system can apply the corresponding optimal frequency band configuration associated with the context profile.

For example, consider the usage scenario involving a high-speed transportation vehicle associated with a fixed (or substantially fixed) physical route, such as a high-speed train (e.g., as illustrated in FIG. 2). In some implementations, the profiling component 312 can generate a context profile associated with the train that accounts for the train's route, the physical location of the train's stations (e.g., pick-up and drop-off locations), the trains speed pattern along the route (e.g., including ramp-up and slow down between stations and sustained periods of high-speeds along the route), and the physical locations and distribution of the respective network base stations (e.g., RRHs $204_{1-K}$ along the train's route. The context profile can define an optimal frequency band profile for applying to CDs located on or within the train that correlates these location and speed pattern attributes with one or more optimal frequency band configurations. For example, the optimal frequency band profile can define different frequency band configurations for applying to CDs at respective locations and times along the trains route that account for the different speeds of the train at the respective locations along the trains route. In some implementations, the optimal frequency band profile can also define respective network base stations (e.g., RRHs $204_{1-K}$ located along the trains route and corresponding frequency band configurations for applying by the respective base stations to CDs that attache thereto that accounts for the trains speed in association with passing by the respective base stations. In some implementations of these embodiments, based on detection of a CD boarding the train at a particular train station and known information about the trains route, the frequency band management component 306 can identify the context profile associated with the trains route as departing from the pick-up location and direct the CD to apply the optimal frequency band configurations coinciding with the route. In other implementations involving an embedded CD that remains physical attached to the train at all time, the scheduling component 304 can configure the embedded CD to apply the optimal frequency band profile adapted for the trains route and speed pattern and direct the embedded CD to broadcast the optimal frequency band configuration to CDs of passengers that board the train.

The context profiles are not limited to fixed trajectories and speed patterns associated with trains and other transportation vehicles that repeatedly follow the same fixed route. For example, in some embodiments, the profiling component 312 can generate context profiles associated with essentially any mobile device route and speed pattern. For example, the context profiles can be associated with specific routes and speed patterns of mobile devices associated with automobiles (e.g., including autonomous vehicles). In other implementations, the context profiles can be associated with specific locations and trajectories where CD typically move in accordance with a particular speed profile or pattern at the locations and/or along the trajectories, such as specific roads, highways or portions thereof. In accordance with these embodiments, the context component 302 can predict, based on CD location and learned movement patterns of the CD, that a CD is moving or about to move in accordance with a defined route and associated speed pattern, and the frequency band management component 306 can schedule the CD (and respecitve APs along the route) to employ the predetermined optimal frequency band configuration tailored to the defined route and speed pattern.

To facilitate generating the context profiles, the context component 302 can collect historical performance data for CDs moving at different speeds and speed patterns, over different routes and trajectories, under different types of service usage contexts and at different frequency band configurations (e.g., different frequency bands assignments). The profiling component 312 can further generate the context profiles based on learned correlations in the historical data between optimal frequency band configurations that provide optimal performance metrics tailored for different UE speeds and speed patterns, routes/trajectories and/or different service usage contexts (e.g., associated usage of different types of services and applications). In various embodiments, the AI component 316 can analyze the historical data using machine learning (ML) and artificial intelligence (AI) in association with learning these correlations and defining the context profiles. The AI component can also facilitate inferring a current context profile associated with CD (e.g., a particular speed pattern and route). As disclosed, in accordance with various embodiments, in connection with or as part of such an AI-based or ML-based analysis, the AI component 316 can employ, build (e.g., construct or create), and/or import, AI and/or ML techniques and algorithms, AI and/or ML models, neural networks (e.g., trained neural networks), and/or graph mining to render and/or generate predictions, inferences, calculations, prognostications, estimates, derivations, forecasts, detections, and/or computations that can facilitate determining the context profiles and inferring current contexts of CD or groups of CDs in association with matching the CDs to a determined context profile.

The AI component 316 can employ various AI-based or ML-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 316 can examine the entirety or a subset of the data (e.g., data collected/determined by the context component 302) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data. Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

In some embodiments, the speed control component 314 can further control/adjust the speed of some high-speed vehicles (e.g., autonomous vehicles, drones, etc.) by directing the vehicle to slow down or speed up in conjunction with optimized frequency band scheduling. For example, the speed control component 314 can direct a vehicle carrying a CD to speed up over a portion of a travel route/trajectory where network base stations are sparse (e.g., spread out over longer distances) in association with configuring the CD to employ a low frequency band (e.g., via the scheduling component 304), thereby ensuring reliable data communication at the high speed in rural areas. Likewise, the communication system can direct a vehicle carrying a CD to slow down for a period of time over which the CD is scheduled to employ a high frequency band for a particular resource demanding data communication service (e.g., requiring low latency, high reliability, high throughput, etc.), thereby ensuring reliable data communication without no or minimal handover over while performing the more demanding data communication service.

In accordance with various embodiments, the network controller module 130 can comprise or be associated with (e.g., communicatively connected to) processor component 318 that can work in conjunction with the other components of the network controller module 130 and/or to facilitate performing the various functions of the network controller module 300 described with reference to the context component 302, the scheduling component 304, the scanning control component 310, the profiling component 312, the speed control component 314 and the AI component 316. The processor component 318 can employ one or more processors, microprocessors, or controllers that can process data, such as information relating to communication devices, users, user preferences, communication sessions, cells, base stations, contexts associated with communication sessions, communication devices, and/or users, characteristics associated with communication sessions, weights or prioritizations to apply to characteristics, frequency band prioritization and connection determinations, communication conditions associated with signals, cells, and/or communication devices, environmental conditions associated with coverage areas, communication network resources, applications, services, metadata, parameters, traffic flows, policies, defined communication management criteria, algorithms (e.g., communication management algorithms, AI or machine learning algorithms, or other algorithms, as disclosed, defined, recited, or indicated herein by the methods, systems, and techniques described herein), protocols, interfaces, tools, and/or other information, to facilitate operation of the network controller module 300, as more fully disclosed herein, and control data flow between the network controller module 300 and other components (e.g., a communication device, a base station or other network component or device of the communication networks 100 and 200, data sources, applications, or other type of component or device) associated with the network controller module 300.

Figure 4:
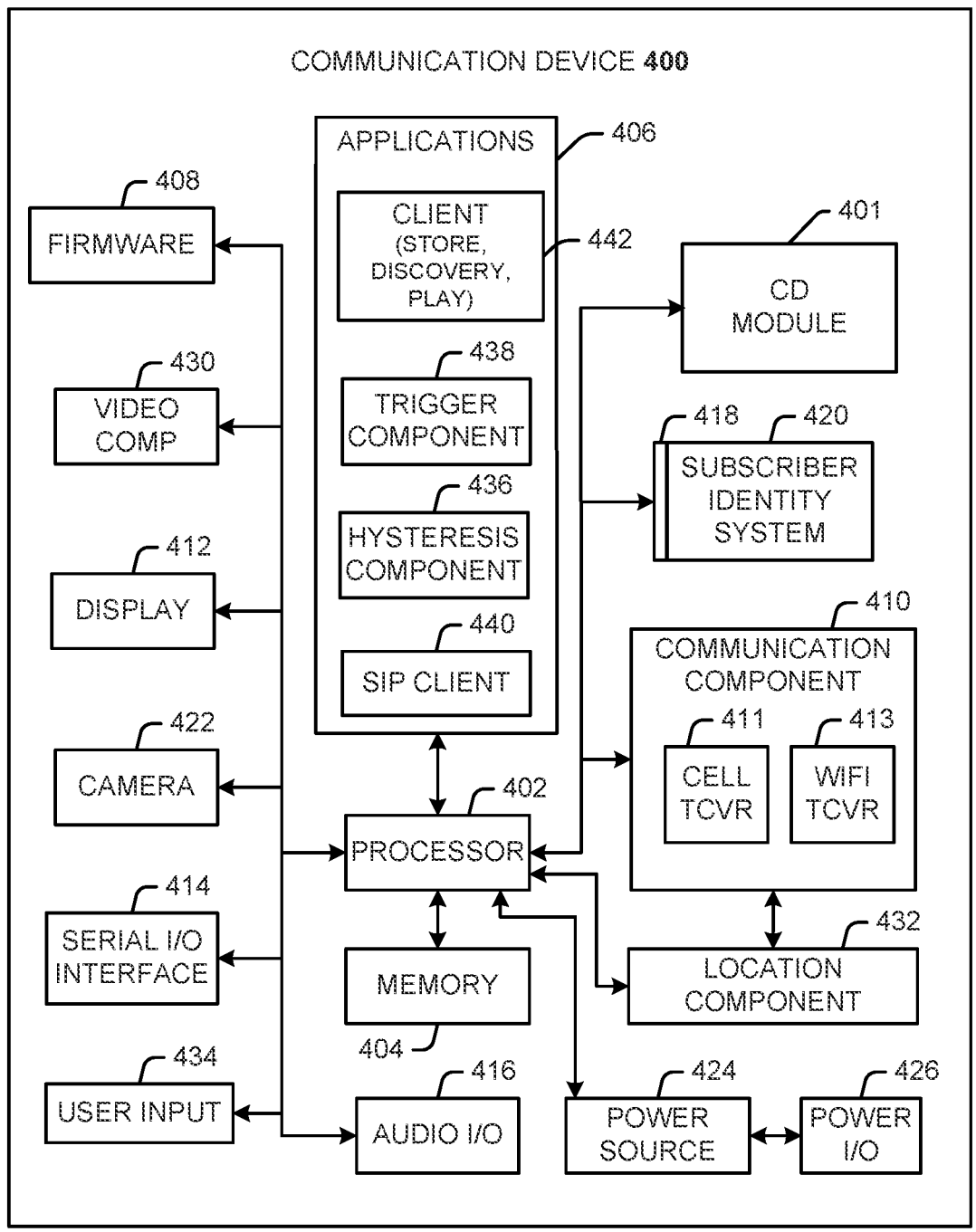
FIG. 4 depicts a block diagram of example communication device that supports speed and service aware frequency band selection, in accordance with various aspects and embodiments of the disclosed subject matter.

FIG. 4 depicts a block diagram of example communication device 400 that supports speed and service aware frequency band selection, in accordance with various aspects and embodiments of the disclosed subject matter. Communication device 400 corresponds to an example CD (e.g., a UE, wireless or mobile phone, electronic pad or tablet, electronic eyewear, electronic watch, or other electronic bodywear, IoT device, or other type of communication device) that can correspond to one or more of the CDs $104_{1-K}$ associated with system 100 and system 200 (e.g., located on or within the train 206). Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The communication device 400 can include a processor 402 for controlling and processing all onboard operations and functions. A memory 404 interfaces to the processor 402 for storage of data and one or more applications 406 (e.g., a video player software, user feedback component software, or other type of application). Other applications can include voice recognition of predetermined voice commands that facilitate initiation of the user feedback signals. The applications 406 can be stored in the memory 404 and/or in a firmware 408, and executed by the processor 402 from either or both the memory 404 or/and the firmware 408. The firmware 408 can also store startup code for execution in initializing the communication device 400. A communication component 410 interfaces to the processor 402 to facilitate wired/wireless communication with external systems, e.g., cellular networks, VoIP networks, and so on. Here, the communication component 410 can also include a suitable cellular transceiver 411 (e.g., a GSM transceiver) and/or an unlicensed transceiver 413 (e.g., Wi-Fi, WiMax) for corresponding signal communications. The communication device 400 can be a device such as a cellular telephone, a PDA with mobile communications capabilities, and messaging-centric devices. The communication component 410 also facilitates communications reception from terrestrial radio networks (e.g., broadcast), digital satellite radio networks, and Internet-based radio services networks.

The communication device 400 includes a display 412 for displaying text, images, video, telephony functions (e.g., a Caller ID function), setup functions, and for user input. For example, the display 412 can also be referred to as a "screen" that can accommodate the presentation of multimedia content (e.g., music metadata, messages, wallpaper, graphics, or other content). The display 412 can also display videos and can facilitate the generation, editing and sharing of video quotes. A serial I/O interface 414 is provided in communication with the processor 402 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 400, for example. Audio capabilities are provided with an audio I/O component 416, which can include a speaker for the output of audio signals related to, for example, indication that the user pressed the proper key or key combination to initiate the user feedback signal. The audio I/O component 416 also facilitates the input of audio signals through a microphone to record data and/or telephony voice data, and for inputting voice signals for telephone conversations.

The communication device 400 can include a slot interface 418 for accommodating a SIC (Subscriber Identity Component) in the form factor of a card Subscriber Identity Module (SIM) or universal SIM 420, and interfacing the SIM card 420 with the processor 402. However, it is to be appreciated that the SIM card 420 can be manufactured into the communication device 400, and updated by downloading data and software.

The communication device 400 can process IP data traffic through the communication component 410 to accommodate IP traffic from an IP network such as, for example, the Internet, a corporate intranet, a home network, a person area network, or other network, through an ISP or broadband cable provider. Thus, VoIP traffic can be utilized by the communication device 400 and IP-based multimedia content can be received in either an encoded or a decoded format.

A video processing component 422 (e.g., a camera) can be provided for decoding encoded multimedia content. The video processing component 422 can aid in facilitating the generation, editing, and sharing of video quotes. The communication device 400 also includes a power source 424 in the form of batteries and/or an AC power subsystem, which power source 424 can interface to an external power system or charging equipment (not shown) by a power I/O component 426.

The communication device 400 can also include a video component 430 for processing video content received and, for recording and transmitting video content. For example, the video component 430 can facilitate the generation, editing and sharing of video quotes. A location tracking component 432 facilitates geographically locating the communication device 400. As described hereinabove, this can occur when the user initiates the feedback signal automatically or manually. A user input component 434 facilitates the user initiating the quality feedback signal. The user input component 434 can also facilitate the generation, editing and sharing of video quotes. The user input component 434 can include such conventional input device technologies such as a keypad, keyboard, mouse, stylus pen, and/or touch screen, for example.

Referring again to the applications 406, a hysteresis component 436 facilitates the analysis and processing of hysteresis data, which is utilized to determine when to associate with the access point. A software trigger component 438 can be provided that facilitates triggering of the hysteresis component 436 when the Wi-Fi transceiver 413 detects the beacon of the access point. A SIP client 440 enables the communication device 400 to support SIP protocols and register the subscriber with the SIP registrar server. The applications 406 can also include a client 442 that provides at least the capability of discovery, play and store of multimedia content, for example, music.

The communication device 400, as indicated above related to the communication component 410, can include an indoor network radio transceiver 413 (e.g., Wi-Fi transceiver). This function supports the indoor radio link, such as IEEE 802.11, for the dual-mode GSM device (e.g., communication device 400). The communication device 400 can accommodate at least satellite radio services through a device (e.g., handset device) that can combine wireless voice and digital radio chipsets into a single device (e.g., single handheld device).

In some embodiments, the communication device 400 can comprise a communication device module (CD module 401) that can facilitate various operations related to speed aware and service aware frequency band management and optimization, as described in greater detail with reference to FIG. 5.

Figure 5:
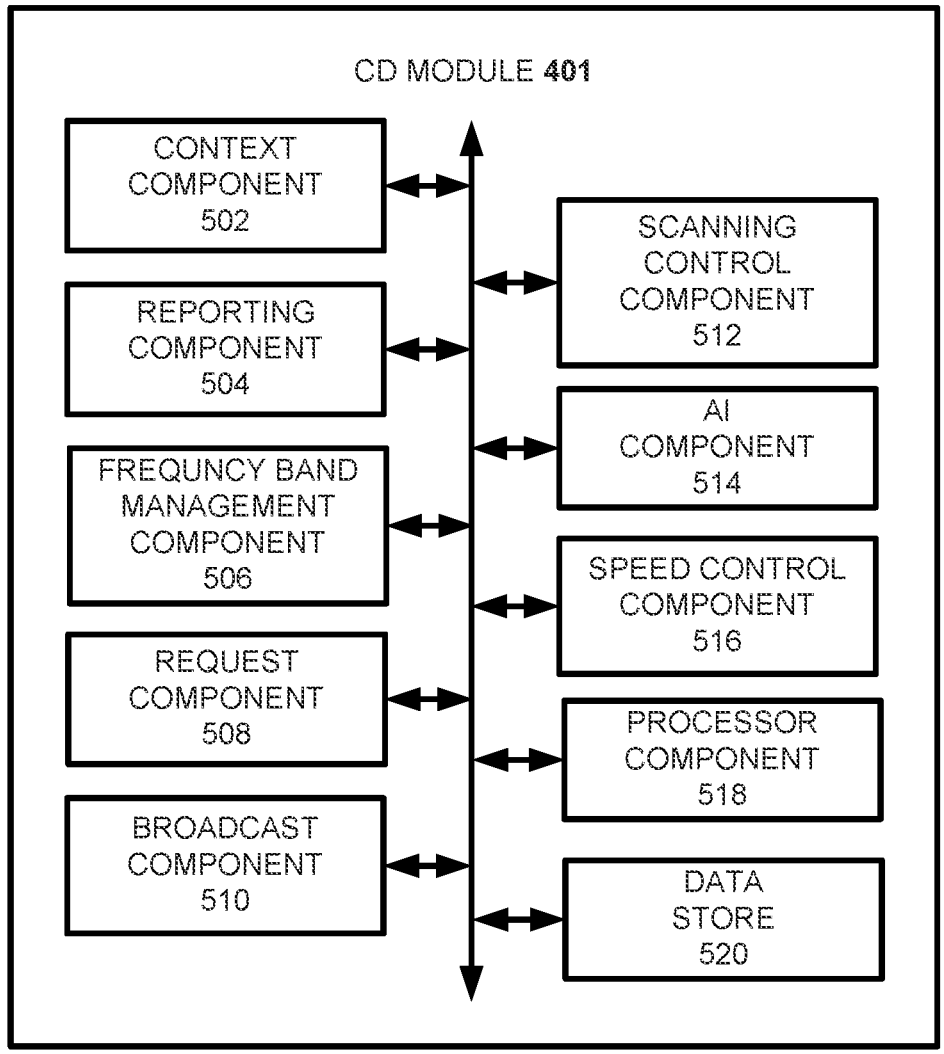
FIG. 5 depicts a block diagram of an example communication device module that facilitates speed and service aware frequency band selection, in accordance with various aspects and embodiments of the disclosed subject matter.

In this regard, FIG. 5 depicts a block diagram of an example CD module 401 that facilitates speed and service aware frequency band selection, in accordance with various aspects and embodiments of the disclosed subject matter. The CD module 401 can comprise various computer executable/machine executable components, including context component 502, reporting component 504, frequency band management component 506, request component 508, broadcast component 510, scanning control component 512, AI component 514, speed control component 516, processor component 518, and a data store 520. With reference to FIG. 5 in view of FIG. 3, one or more of these components can provide same or similar features and functionalities described with reference to the corresponding components as associated with the network controller module 300. Repetitive description of like elements employed in respective embodiments is omitted for sake of brevity.

In this regard, in some embodiments, the CD module 401 can include context component 502 to determine or infer context information for a CD, including information regarding CD speed, CD location, CD trajectory, (e.g., direction of movement, route, etc.), and applications and services being utilized, expected to be utilized, and/or requested for utilization, by the CDs in association with data communication sessions. The context component 502 can employ same, similar or different techniques described with reference to context component 302 to determine or infer the context information. In some embodiments, the reporting component 504 can further report the CD determined context information to the network controller module 300 for usage thereof in association with selecting/determining the optimal frequency band or frequency band profile for scheduling the CD. The network controller module 300 can further aggregate any received context information reported by a CD as historical data for analysis by the AI component 316 and generating context profiles by the profiling component 312 based on the analysis thereof.

In other embodiments, the CD module 401 can include a frequency band management component 506 to determine or select an optimal frequency band or frequency band profile for utilization by the CD based on the context information (e.g., speed, speed pattern, route/trajectory, applications/services being utilized, etc.). With these embodiments, the data 520 can store same or similar frequency band scheduling information and/or context profile information described above and the frequency band management component 506 can employ the information stored in the data store 520 to determine or select the optimal frequency band or frequency band class (e.g., low, mid, high, etc.) tailored to the CD context. The request component 508 can further generate and send a request message to the network controller module 300 requesting the optimal frequency band or frequency band class. As described above with reference to FIG. 3, in accordance with these embodiments, based on reception of such a request, the frequency band management component 306 can schedule the CD and its serving node to utilize the requested frequency band and/or a network selected frequency band included in the requested frequency band class.

The CD module 401 can include broadcast component 510 to broadcast or facilitate broadcasting received frequency band scheduling/configuration information to other nearby CDs (e.g., other CDs located on or within the same transportation vehicle), as described with reference to FIG. 3.

The scanning control component 512 can provide same or similar feature and functionalities as described with reference to scanning control component 310. In this regard, in some embodiments, the scanning control component 512 can execute or apply scanning control instructions received from the network controller module 300. As describe with reference to FIG. 3, the scanning control instructions can direct the CD to temporarily disable or deactivate scanning for one or more radio frequencies excluding the scheduled radio frequency or group of radio frequencies tailored to the CD context. In other embodiments, the scanning control component 512 can be configured to automatically temporarily disable or deactivate scanning for one or more radio frequencies excluding the scheduled radio frequency or group of radio frequencies in response to reception of a scheduled frequency band configuration determined by the network controller module 300.

The AI component 514 can perform same or similar features and functionalities as AI component 316 yet tailored to the specific CD in which the CD module 401 is deployed. In this regard, the AI component 514 can perform ML/AI analysis of historical context information for the CD to facilitate determining or inferring current or upcoming contexts of the CD, including predicting speed, speed patterns and speed changes of the CD, and predicting routes and trajectories of the CD (e.g., based on learned correlations and patterns in the historical context information for the CD). The AI component 514 can also analyze the historical context information in conjunction with frequency band configurations scheduled for the UE in association with the different contexts (e.g., different speeds, speed patterns, locations, trajectories, service type usage, etc.) to learn optimal frequency band profiles tailored to different contexts of the CD. In some implementations, the request component 508 can employ the learned optimal frequency band profiles in association with selecting an optimal frequency band profile to apply for the CD based on a current context of the device. (e.g., requesting application of the same frequency band profile that resulting in optimal service performance characteristics when returning to the same trajectory and/or speed pattern).

The CD module can also include a speed control component 516 that can perform same or similar operations described with reference to speed control component 314 in embodiments in which the CD device is located on or withing a vehicle. In some embodiments, the speed control component 516 can directly control (e.g., in implementations in which the CD module 401 is associated with CD that is directly coupled to a vehicle speed control module) or remotely control the speed of the vehicle based on context of the CD and the frequency band configuration applied for the CD. For example, the speed control component 516 can prevent the vehicle from exceeding a certain threshold speed in association with usage of a high frequency band by the CD. In another example, the speed control component 516 can enable the vehicle to speed up beyond a certain threshold speed (or cause the vehicle to increase its speed above the threshold speed) based on usage of a low or mid-range frequency band by the CD.

In accordance with some embodiments, the CD module 401 can comprise or be associated with (e.g., communicatively connected to) processor component 518 that can work in conjunction with the other components of the CD module 401 and/or to facilitate performing the various functions of the CD module described with reference to the context component 502, the reporting component 504, the frequency band management component 506, the request component 508, the broadcast component 510, the scanning control component 512, the AI component 514, and the speed control component 516. In some implementations, the processor component 518 can correspond to processor 402 and the data store 520 can correspond to memory 404 of communication device 400.

Figure 6:
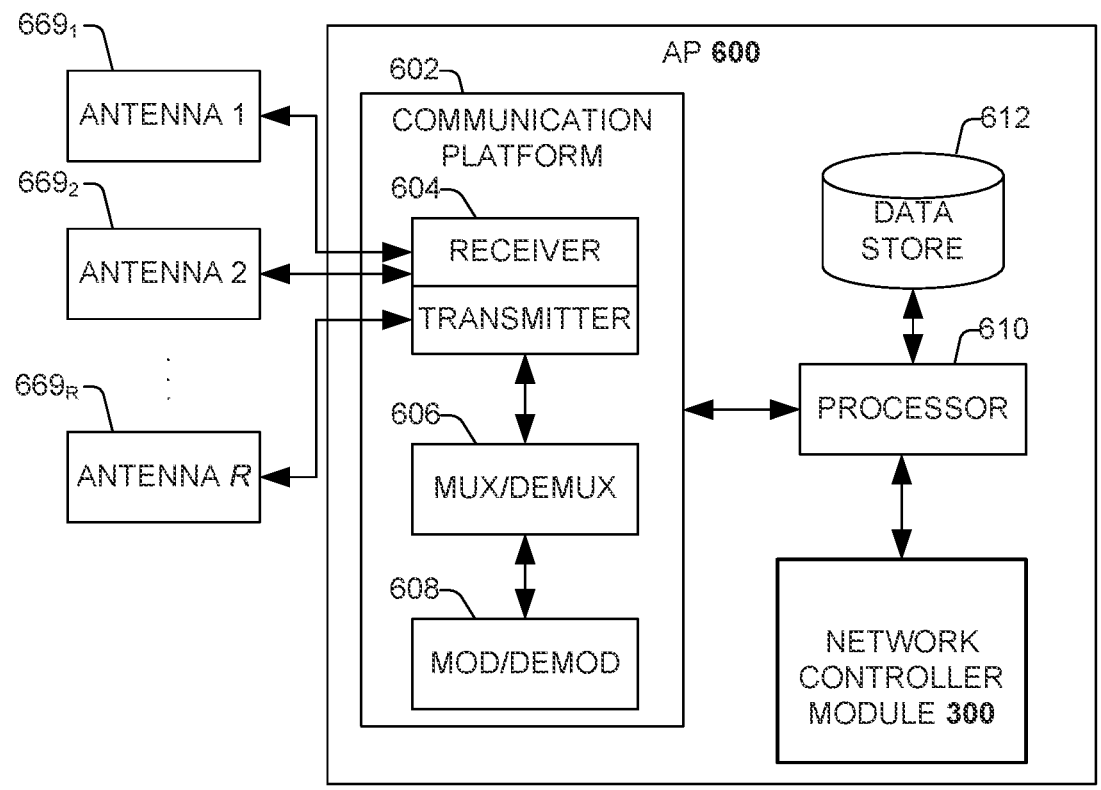
FIG. 6 illustrates a block diagram of an example access point, in accordance with various aspects and embodiments of the disclosed subject matter.

FIG. 6 illustrates a block diagram of an example access point (AP 600), in accordance with various aspects and embodiments of the disclosed subject matter. The AP 600 can correspond to an example of any of the APs $104_{1-K}$ described herein. The AP 600 can receive and transmit signal(s) from and to wireless devices like access points (e.g., base stations, femtocells, picocells, or other type of AP), access terminals (e.g., UEs), wireless ports and routers, and the like, through a set of antennas $669_1$-$669_R$. In an aspect, the antennas $669_1$-$669_R$ are a part of a communication platform 602, which comprises electronic components and associated circuitry that can provide for processing and manipulation of received signal(s) and signal(s) to be transmitted. In an aspect, the communication platform 602 can include a receiver/transmitter 604 that can convert signal from analog to digital upon reception, and from digital to analog upon transmission. In addition, receiver/transmitter 604 can divide a single data stream into multiple, parallel data streams, or perform the reciprocal operation.

In an aspect, coupled to receiver/transmitter 604 can be a multiplexer/demultiplexer (mux/demux) 606 that can facilitate manipulation of signal in time and frequency space. The mux/demux 606 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), or another desired multiplexing scheme. In addition, mux/demux component 606 can scramble and spread information (e.g., codes) according to substantially any code known in the art, e.g., Hadamard-Walsh codes, Baker codes, Kasami codes, polyphase codes, and so on. A modulator/demodulator (mod/demod) 608 also can be part of the communication platform 602, and can modulate information according to multiple modulation techniques, such as frequency modulation, amplitude modulation (e.g., M-ary quadrature amplitude modulation (QAM), with M a positive integer), phase-shift keying (PSK), and the like.

The AP 600 also can comprise a processor(s) 610 that can be configured to confer and/or facilitate providing functionality, at least partially, to substantially any electronic component in or associated with the AP 600. For instance, the processor(s) 610 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, or other operations on data.

In another aspect, the AP 600 can include a data store 612 that can store data structures; code instructions; rate coding information; information relating to measurement of radio link quality or reception of information related thereto; information relating to communication conditions (e.g., signal-to-interference-plus-noise ratio (SINR), reference signal received power (RSRP), reference signal received quality (RSRQ), channel quality indicator (CQI), and/or other wireless communications metrics or parameters) associated with communication devices; information relating to communication devices, users, subscriber-related information, usage data, historical usage data, location data (e.g., data regarding locations of communication devices), queries, power information, applications, services, threshold values (e.g., defined threshold data throughput values, defined threshold QoS values, or other type of threshold value), metadata, parameters, traffic flows, policies, rules, signaling, defined network security criteria, network security algorithms, protocols, interfaces, tools, and/or other information; white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 610 can be coupled to the data store 612 in order to store and retrieve information (e.g., information, such as algorithms, relating to multiplexing/demultiplexing or modulation/demodulation; information relating to radio link levels; information relating to communication conditions (e.g., SINR, RSRP, RSRQ, CQI, and/or other wireless communications metrics or parameters) associated with communication devices; information relating to communication devices, users, subscriber-related information, usage data, historical usage data, location data (e.g., data regarding locations of communication devices), queries, power information, applications, services, threshold values (e.g., defined threshold data throughput values, defined QoS values, or other type of threshold value), metadata, parameters, traffic flows, policies, rules, signaling, defined network security criteria, network security algorithms, protocols, interfaces, tools, and/or other information that can be desired to operate and/or confer functionality to the communication platform 602 and/or other operational components of AP 600.

In some embodiments, the AP 600 can comprise an instance of the network controller module 300 or one or more components thereof.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 7-11. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 7:
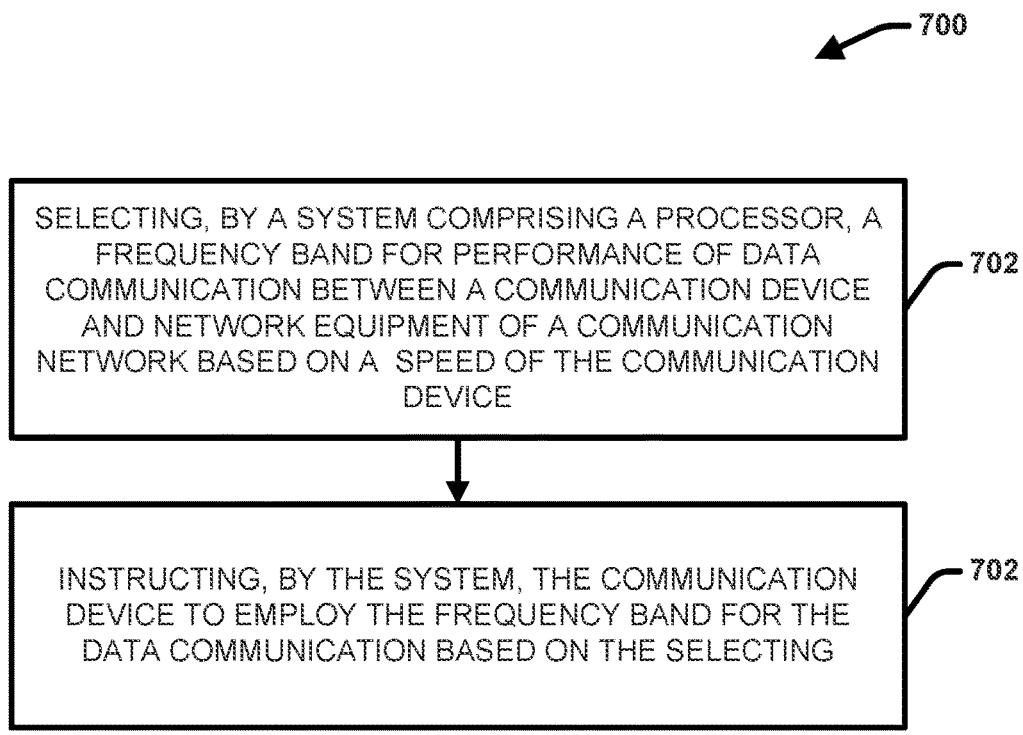
FIG. 7 illustrates a flow chart of an example method for managing frequency band selection in accordance with various aspects and embodiments of the disclosed subject matter.

FIG. 7 illustrates a flow chart of an example method 700 for managing frequency band selection in accordance with various aspects and embodiments of the disclosed subject matter. Method 700 corresponds to an example method that can be performed by network equipment of a wireless communication network (e.g., of communication system 100, communication system 200, or the like) using one or more components of the network controller module 300. Repetitive description of like elements employed in respective embodiments is omitted for sake of brevity.

In accordance with method 700, at 702, a system comprising a processor, can select a frequency band for performance of data communication between a communication device and network equipment (e.g., the serving node/AP and optionally one or more target nodes along the CDs trajectory) of a communication network based on speed of the communication device (e.g., using frequency band management component 306). At 702, the system can further instruct the communication device to employ the frequency band for the data communication based on the selecting (e.g., using scheduling component 304).

Figure 8:
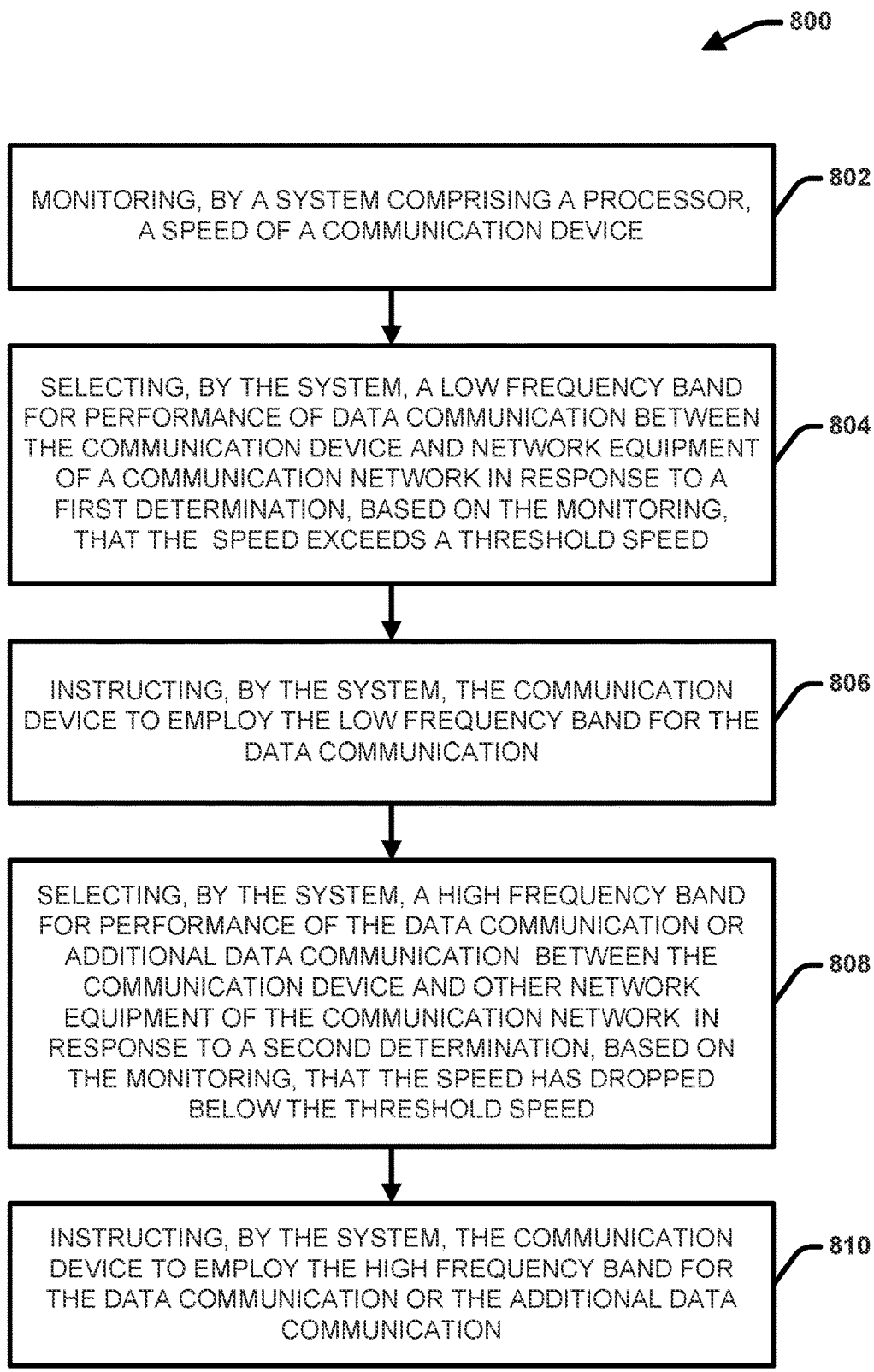
FIG. 8 illustrates a flow chart of another example method for managing frequency band selection in accordance with various aspects and embodiments of the disclosed subject matter.

FIG. 8 illustrates a flow chart of another example method 800 for managing frequency band selection in accordance with various aspects and embodiments of the disclosed subject matter. Method 800 corresponds to another example method that can be performed by network equipment of a wireless communication network (e.g., of communication system 100, communication system 200, or the like) using one or more components of the network controller module 300. Repetitive description of like elements employed in respective embodiments is omitted for sake of brevity.

In accordance with method 800, at 802, a system comprising a processor, can monitor the speed of a communication device (e.g., using context component 302). At 804, the system can select (e.g., using frequency band management component 306) a low frequency band for performance of data communication between the communication device and network equipment (e.g., the serving node/AP and optionally one or more target nodes along the CDs trajectory) of a communication network in response to a first determination (e.g., by the context component 302), based on the monitoring, that the speed exceeds a threshold. At 806, the system can further instruct the communication device to employ the low frequency band for the data communication (e.g., using scheduling component 304). At 808, the system can select a high frequency band for performance of the data communication or additional data communication between the communication device and other network equipment of the communication network (e.g., a target node or a new serving node following a handover) in response to a second determination, based on the monitoring, that the speed has dropped below the threshold speed. At 810, the system can further direct the communication device to employ the high frequency band for the data communication or the additional data communication.

Figure 9:
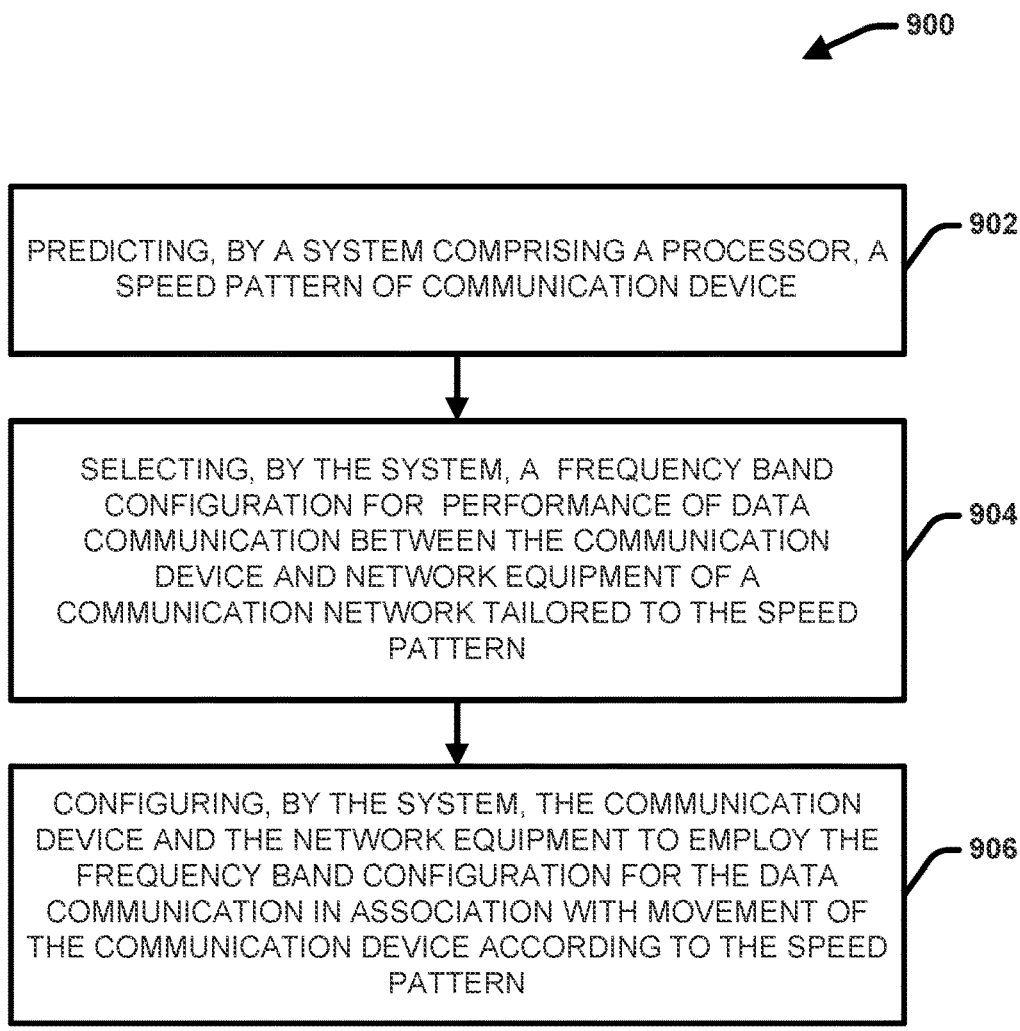
FIG. 9 illustrates a flow chart of another example method for managing frequency band selection in accordance with various aspects and embodiments of the disclosed subject matter.

FIG. 9 illustrates a flow chart of another example method 900 for managing frequency band selection in accordance with various aspects and embodiments of the disclosed subject matter. Method 900 corresponds to another example method that can be performed by network equipment of a wireless communication network (e.g., of communication system 100, communication system 200, or the like) using one or more components of the network controller module 300. Repetitive description of like elements employed in respective embodiments is omitted for sake of brevity.

In accordance with method 900, at 902, a system comprising a processor, can predict a speed pattern of a communication device (e.g., using context component 302 and/or AI component 316). For example, the system can predict an upcoming speed pattern of the device using ML and AI tactics based on a context of the device, such as a location of the device, a movement pattern of the device, and previous speed patterns of the device and similar devices in the context. At 904, the system can select (e.g., using frequency band management component 306) a frequency band configuration for performance of data communication between the communication device and network equipment of a communication network tailored to the speed pattern (e.g., as defined in one or more context profiles determined/generated by the profiling component 312). At 906, the system can further configure (e.g., using scheduling component 304) the communication device and the network equipment to employ the frequency band configuration for the data communication in association with movement of the communication device according to the speed pattern.

Figure 10:
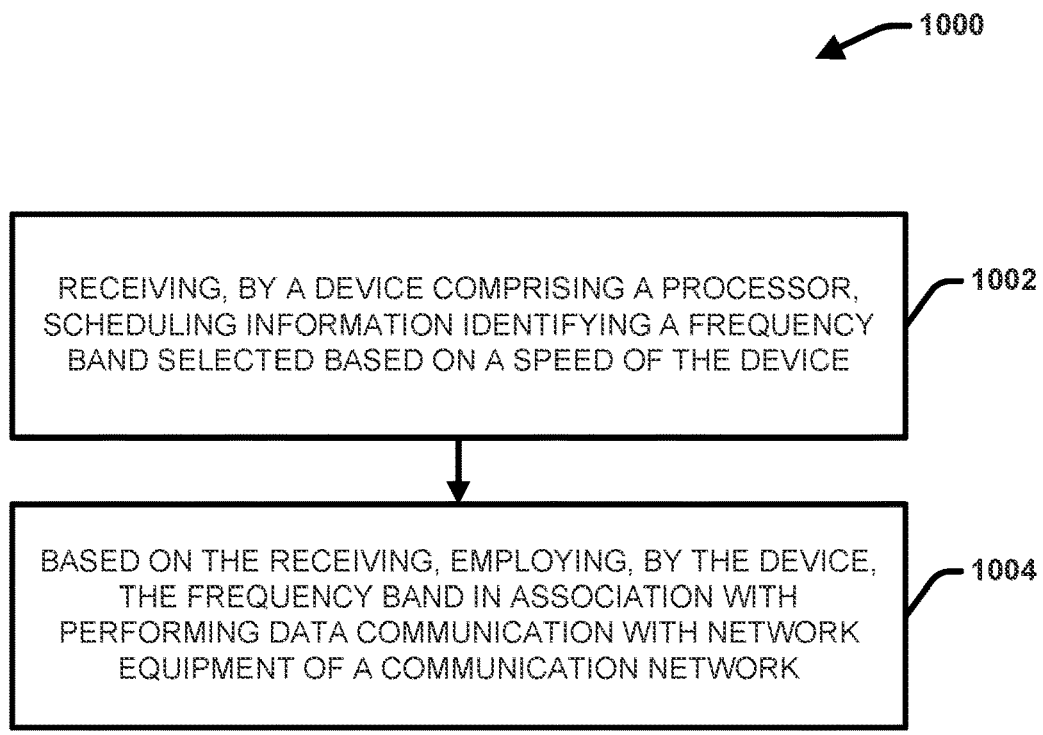
FIG. 10 illustrates a flow chart of another example method for managing frequency band selection in accordance with various aspects and embodiments of the disclosed subject matter.

FIG. 10 illustrates a flow chart of another example method 1000 for managing frequency band selection in accordance with various aspects and embodiments of the disclosed subject matter. Method 1000 corresponds to an example method that can be performed by a communication device of a wireless communication network (e.g., of communication system 100, communication system 200, or the like) using one or more components of the CD module 401. Repetitive description of like elements employed in respective embodiments is omitted for sake of brevity.

In accordance with method 1000, at 1002, a device comprising a processor, (e.g., a communication device, a UE, etc.), can receive scheduling information identifying a frequency band selected based on a speed of the device. At 1004, based on the receiving, the device and employ the frequency band in association with performing data communication with network equipment of a communication network.

Figure 11:
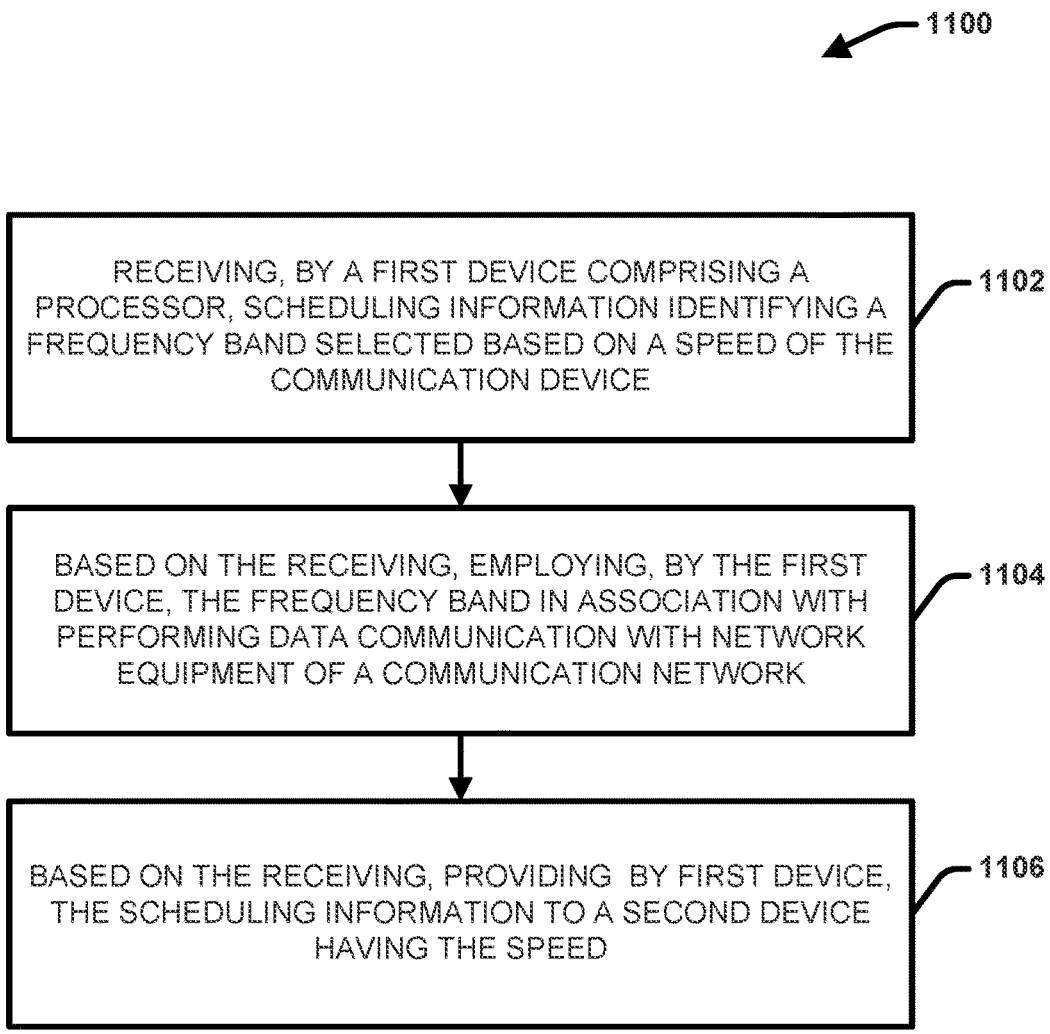
FIG. 11 illustrates a flow chart of another example method for managing frequency band selection in accordance with various aspects and embodiments of the disclosed subject matter.

FIG. 11 illustrates a flow chart of another example method 1100 for managing frequency band selection in accordance with various aspects and embodiments of the disclosed subject matter. Method 1100 corresponds to an example method that can be performed by a communication device of a wireless communication network (e.g., of communication system 100, communication system 200, or the like) using one or more components of the CD module 401. Repetitive description of like elements employed in respective embodiments is omitted for sake of brevity.

In accordance with method 1100, at 1002, a first device comprising a processor, (e.g., a communication device, a UE, etc.), can receive scheduling information identifying a frequency band selected based on a speed of the device. At 1104, based on the receiving, the first device and employ the frequency band in association with performing data communication with network equipment of a communication network. In addition, at 1106, based on the receiving, the first device can provide the scheduling information to a second device having the speed (e.g., one or more additional CD located on the same transportation vehicle).

Figure 12:
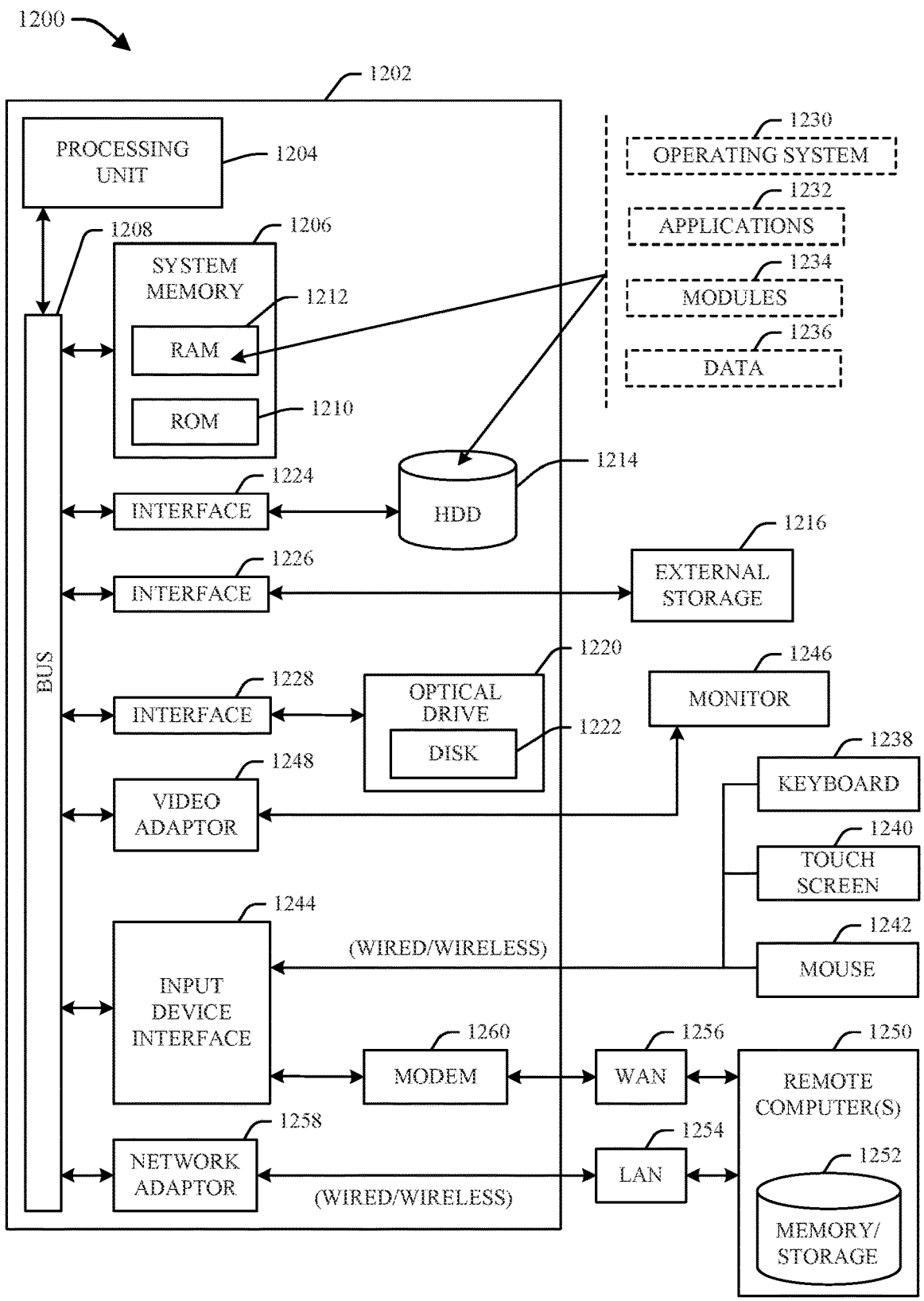
FIG. 12 is a schematic block diagram illustrating a suitable computing environment in which the various embodiments of the embodiments described herein can be implemented.

In order to provide additional context for various embodiments described herein, FIG. 12 and the following discussion are intended to provide a brief, general description of a suitable computing environment 1200 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, or other type of storage device) and an optical disk drive 1220 (e.g., which can read or write from a CD-ROM disc, a DVD, a BD, or other disk drive). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 13124 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 13124 serial port, a game port, a USB port, an IR interface, a BLUETOOTH™ interface, or other type of interface.

A monitor 1246 or other type of display device can be also connected to the system bus 1208 via an interface, such as a video adapter 1248. In addition to the monitor 1246, a computer typically includes other peripheral output devices (not shown), such as speakers, printers, or other type of peripheral output device.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256, e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, or other equipment or entity), and telephone. This can include Wireless Fidelity (Wi-Fi) and BLUETOOTH™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, or other alphanumeric character) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; BLUETOOTH™; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); or other type of wireless telecommunication or radio technology. Additionally, some or all of the aspects described herein can be exploited in legacy telecommunication technologies, e.g., GSM. In addition, mobile as well non-mobile networks (e.g., the internet, data service network such as internet protocol television (IPTV), or other network) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, or other type of magnetic storage device), optical discs (e.g., compact disc (CD), digital versatile disc (DVD), blu-ray disc (BD), or other type of optical disc), smart cards, and memory devices comprising volatile memory and/or non-volatile memory (e.g., flash memory devices, such as, for example, card, stick, key drive, or other type of memory device), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, UE, base station, cell, communication network, UEM, CM, RM, application, service, AI component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        selecting a frequency band for performance of data communication between a communication device and network equipment of a communication network based on a speed of the communication device;
        instructing the communication device to employ the frequency band for the data communication based on the selecting;
        determining particular frequency band profiles for different speeds based on machine learning analysis of performance metrics regarding historical data communications between communication devices and the network equipment performed with the communication devices under the different speeds and using different frequency bands; and
        applying the particular frequency band profiles in association with scheduling future data communications performed under the different speeds.

2. The system of claim 1, wherein the selecting comprises selecting a first frequency band based on the speed being at least a first speed and selecting a second frequency band based on the speed being a second speed lower than the first speed, and wherein the second frequency band comprises a higher frequency band relative to the first frequency band.

3. The system of claim 1, wherein the selecting comprises selecting a first frequency band based on the speed being at most a first speed and selecting a second frequency band based on the speed being a second speed higher than the first speed, and wherein the second frequency band comprises a lower frequency band relative to the first frequency band.

4. The system of claim 1, wherein the selecting is further based on detection of the speed satisfying a function of a threshold speed.

5. The system of claim 4, wherein the selecting comprises selecting the frequency band from a group of radio frequency bands comprising a low-range frequency band, a mid-range frequency band comprising mid-range frequencies higher than low-range frequencies of the low-range frequency band, and a high-range frequency band comprising high-range frequencies higher than the mid-range frequencies, and wherein the selecting comprises selecting the low-range frequency band or the mid-range frequency band based on the speed being determined to exceed the threshold speed.

6. The system of claim 5, wherein the operations further comprise:
selecting the high-range frequency band for the performance of the data communication between the device and the network equipment or second network equipment based on detection of a decrease in the speed below the threshold speed; and
instructing the communication device to employ the high range frequency band for the data communication based on selecting the high range frequency band.

7. The system of claim 4, wherein the operations further comprise:
instructing the communication device to refrain from scanning other frequency bands excluding the frequency based on instructing the communication device to employ the frequency band.

8. The system of claim 1, wherein the selecting is further based on a service associated with the data communication, and wherein the frequency band that is selected varies for different types of services.

9. The system of claim 3, wherein the operations further comprise:
identifying a group of communication devices moving with the speed, the group including the communication device; and
instructing the group of communication devices to employ the frequency band in association with performing data communications with the network equipment.

10. The system of claim 9, wherein the identifying is based co-location of the group of communication devices on the same transportation vehicle.

11. The system of claim 1, wherein the network equipment is associated with a fixed location, and wherein the selecting is further based on a learned frequency band profile associated with the fixed location and the communication device being within a defined radius of the fixed location.

12. The system of claim 1, wherein the selecting the frequency band comprises selecting the frequency band from a plurality of frequency bands defined in the particular frequency band profiles.

13. A device, comprising:
a processor; and
a memory that stores executable instructions that, when executed by the processor, facilitate performance of operations, comprising:
receiving scheduling information identifying a frequency band selected based on a speed of the device;
based on the receiving, employing the frequency band in association with performing data communication with network equipment of a communication network; and
sending request information to the network equipment indicating a preferred frequency band for the data communication based on a determination that the speed satisfies a speed criterion, wherein the receiving is responsive to the sending.

14. The device of claim 13, wherein a frequency level of the frequency band selected decreases as a function of increase in the speed.

15. The device of claim 13, wherein the operations further comprise:
determining particular frequency band profiles for different speeds based on machine learning analysis of performance metrics regarding historical data communications between communication devices and the network equipment performed with the communication devices under the different speeds and using different frequency bands; and
applying the particular frequency band profiles in association with scheduling future data communications performed under the different speeds.

16. The device of claim 13, wherein the receiving is responsive to selection of the frequency band based on the speed exceeding a threshold speed.

17. The device of claim 13, wherein the device is a first device, and wherein the operations further comprise:
communicating the scheduling information to a second device having the speed based on the receiving.

18. The device of claim 13, wherein the operations further comprise:
refraining from scanning other frequency bands other than the frequency band based on the receiving.

19. A non-transitory machine-readable medium, comprising executable instructions that, when executed by a processor, facilitate performance of operations, comprising:
selecting a frequency band for performance of a data communication between a communication device and network equipment of a communication network based on a speed of the communication device;
in response to the selecting, sending, to the communication device, band data representative of the frequency band for the communication device to use for the data communication;
determining particular frequency band profiles for different speeds based on machine learning analysis of performance metrics regarding historical data communications between communication devices and the network equipment performed with the communication devices under the different speeds and using different frequency bands; and
applying the particular frequency band profiles in association with scheduling future data communications performed under the different speeds.

20. The non-transitory machine-readable medium of claim 19, wherein the selecting comprises selecting a first frequency band based on the speed being a first speed and selecting a second frequency band based on the speed being a second speed lower than the first speed, and wherein the second frequency band comprises a higher frequency band relative to the first frequency band.

* * * * *